US012784064B2

(12) United States Patent
Eutsler et al.

(10) Patent No.: US 12,784,064 B2
(45) **Date of Patent: *Nov. 3, 2026**

(54) TOKENIZED STRUCTURED PROVENANCE TRACKING

(71) Applicant: Wells Fargo Bank, N.A., San Francisco, CA (US)

(72) Inventors: Nathaniel C. Eutsler, San Francisco, CA (US); Matthew Mullin Shepherd, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/332,857

(22) Filed: Sep. 18, 2025

(65) Prior Publication Data

US 2026/0017673 A1 Jan. 15, 2026

Related U.S. Application Data

(63) Continuation of application No. 17/968,635, filed on Oct. 18, 2022, now Pat. No. 12,505,455.

(51) Int. Cl.
*G06Q 30/018* (2023.01)
*G06Q 20/38* (2012.01)

(52) U.S. Cl.
CPC ..... *G06Q 30/0185* (2013.01); *G06Q 20/3827* (2013.01); *G06Q 20/389* (2013.01)

(58) Field of Classification Search
CPC ........... G06Q 30/0185; G06Q 20/3827; G06Q 20/389; G06Q 20/405
See application file for complete search history.

(56) References Cited

U.S. PATENT DOCUMENTS

| | | | |
|---|---|---|---|
| 11,154,783 | B1 | 10/2021 | Koch et al. |
| 11,562,451 | B1 | 1/2023 | Kozlowski |
| 11,836,690 | B1 | 12/2023 | Stroke et al. |
| 2009/0324025 | A1 | 12/2009 | Camp et al. |
| 2016/0371776 | A1 | 12/2016 | Sato |
| 2020/0005284 | A1 | 1/2020 | Vijayan |

(Continued)

FOREIGN PATENT DOCUMENTS

| | | | |
|---|---|---|---|
| CN | 113706175 | A | 11/2021 |
| EP | 3 540 662 | A1 | 9/2019 |

(Continued)

OTHER PUBLICATIONS

Noura Alnuaimi, NFT Certificates and Proof of Delivery for Fine Jewelry and Gemstones, Sep. 2022, IEEE, https://ieeexplore.ieee.org/stamp/stamp.jsp?tp=&arnumber=9899445&tag=1 (Year: 2022).*

(Continued)

*Primary Examiner* — Chunling Ding
(74) *Attorney, Agent, or Firm* — Foley & Lardner LLP

(57) ABSTRACT

Systems, methods, and computer-readable storage media to track provenance of assets utilizing non-fungible tokens (NFTs). One method includes receiving a provenance request, generating a first non-fungible token (NFT) encapsulated with a first control structure, generating a second NFT encapsulated within a second control structure, and tracking provenance of assets utilizing the first NFT and second NFT.

20 Claims, 8 Drawing Sheets

(56) References Cited

U.S. PATENT DOCUMENTS

2020/0322154 A1* 10/2020 Konda ...................... H04L 9/30
2020/0342539 A1 10/2020 Doney
2020/0364373 A1 11/2020 Huang et al.
2021/0004739 A1 1/2021 Gill et al.
2021/0065293 A1 3/2021 Sigler et al.
2021/0097508 A1 4/2021 Papanikolas
2021/0133700 A1 5/2021 Williams et al.
2021/0150626 A1 5/2021 Robotham
2021/0248594 A1 8/2021 Yantis et al.
2021/0281410 A1 9/2021 Hain
2021/0326862 A1 10/2021 Yantis et al.
2021/0374791 A1 12/2021 Kim
2022/0010316 A1 1/2022 Novick et al.
2022/0027902 A1 1/2022 Vandenberg et al.
2022/0058630 A1 2/2022 Yantis et al.
2022/0058633 A1 2/2022 Yantis et al.
2022/0075845 A1 3/2022 Bowen et al.
2022/0101316 A1 3/2022 Cramer
2022/0222364 A1 7/2022 Roberts et al.
2022/0383295 A1 12/2022 Cox et al.
2023/0011621 A1 1/2023 Jakobsson et al.
2023/0034169 A1 2/2023 Ferenczi
2023/0034621 A1 2/2023 Pardo
2023/0045071 A1 2/2023 Kalaldeh et al.
2023/0070586 A1* 3/2023 Kapur .................. G06Q 20/123
2023/0088936 A1* 3/2023 Chalkley ................ G06Q 10/00 705/26.81
2023/0102889 A1 3/2023 Keiter et al.
2023/0114684 A1* 4/2023 Jakobsson ............. H04L 9/3213 713/159
2023/0119641 A1 4/2023 Meyers et al.
2023/0130182 A1* 4/2023 Mir ....................... H04L 9/3247 713/189
2023/0135947 A1* 5/2023 Barhudarian ............. H04L 9/30 726/26
2023/0137867 A1 5/2023 Walters et al.
2023/0139878 A1* 5/2023 Clark ................. G06Q 30/0185 713/157
2023/0177070 A1* 6/2023 Shih .......................... H04L 9/50 707/822
2023/0222467 A1* 7/2023 Wang ..................... G06Q 30/06 705/71
2023/0315819 A1 10/2023 Guy et al.
2023/0316280 A1 10/2023 Sardari et al.
2023/0351347 A1 11/2023 Damrow
2023/0368184 A1 11/2023 Polasa et al.
2024/0012915 A1* 1/2024 Andon .................. G06F 21/602
2024/0020624 A1* 1/2024 Williams .............. H04L 9/3213
2024/0031153 A1 1/2024 Dravneek et al.
2024/0070660 A1 2/2024 Milne et al.
2024/0104521 A1 3/2024 Azgad-Tromer et al.

FOREIGN PATENT DOCUMENTS

KR 10-2196001 B1 12/2020
WO WO-2021/041746 A1 3/2021
WO WO-2023034423 A1 * 3/2023 ............... H04L 9/50

OTHER PUBLICATIONS

Noura Alnuaimi, NFT Certificates and Proof of Delivery for Fine Jewelry and Gemstones, Sep. 2022, IEEE, https://ieeexplore.ieee.org/stamp/stamp.jsp'?tp=&arnumber=9899445 (Year: 2022).
Dietrich et al., 2021, Classification Model Of Supply Chain Events Regarding Their Transferability To Blockchain Technology.
Globe Newswire, "The Stoned Ape Crew NFT Evolution is Live!," (Jan. 26, 2022), https://www.globenewswire.com/en/news-release/2022/01/26/2373679/0/en/The-Stoned-Ape-Crew-NFT-Evolution-is-Live.html, pp. 1-4.
Gupta et al., "NFTs and the Cryptoverse," (Sep. 25, 2021), https://www.cryptechie.com/p/nft, pp. 1-23.
Ismail et al., 2021, TRABAC: A Tokenized Role-Attribute Based Access Control using Smart Contract for Supply Chain Applications.
Johnson et al., 2021, "Creating Generative Art NFTs from Genomic Data.".
La Fountain et al., "Non-Fungible Tokens, Libraries, and Publishers," (Jul./Aug. 2021), https://www.infotoday.com/OnlineSearcher/Articles/Features/NonFungible-Tokens-Libraries-and-Publishers-147856.shtml, pp. 1-5.
Investopedia, "Blockchain Explained," 2021, The Wayback Machine, pp. 1-29.
Investopedia, Blockchain Explained, Sep. 5, 2021, https://web.archive.org/web/20210905101727/https://www.investopedia.com/terms/b/blockchain.asp (Year: 2021).
Murray, Michael D. "N FT ownership and copyrights." Ind. L. Rev. 56 (2022): 367. (Year: 2022).
Raza et al., "Wells Fargo To Launch Digital Asset For Internal Transactions," (Sep. 18, 2019), https://insidebitcoins.com/news/wells-fargo-to-launch-digital-asset-for-internal-transactions, pp. 1-4.
Tahtacioglu et al., NFT with Chainlink Oracle—Blockchain Roadmap. (2022).
xHashtag, "Introducing #Selena—The First Liquid NFT Collection on Solana," Sep. 22, 2021, downloaded Sep. 13, 2022, https://medium.com/xhashtag/introducing-selena-the-first-liquid-nft-collection-on-solana-da568f6311d5.

* cited by examiner

600

TOKENIZED STRUCTURED PROVENANCE TRACKING

CROSS-REFERENCE TO RELATED APPLICATIONS AND CLAIM OF PRIORITY

This application is a continuation of and claims priority to U.S. patent application Ser. No. 17/968,635, titled "Tokenized Structured Provenance Tracking," filed Oct. 18, 2022, which is incorporated herein by reference in its entirety and for all purposes.

TECHNICAL FIELD

The present implementations relate generally to assets, and more particularly to asset provenance tracking.

BACKGROUND

The present disclosure relates generally to assets, and more particularly to asset provenance tracking. In a computer networked environment such as the internet, users and entities such as people or companies exchange both physical and digital assets.

SUMMARY

Some arrangements relate to a system to track provenance of assets utilizing non-fungible tokens (NFTs). The system includes a data processing system including memory and one or more processors to receive a provenance request for a physical asset associated with a proposed route, generate a first metadata object including metadata of the physical asset and a plurality of attributes for outputting based on the proposed route, generate, based on the first metadata object, a first NFT including a first link with the first metadata object, wherein the first NFT is encapsulated within a first control structure that restricts a first output of the first metadata object to a first remote device remote from the one or more processors, and wherein the first NFT digitally represents the physical asset, generate a second metadata object including an aggregation of a first digital asset of the physical asset and at least one of the first NFT or a first cryptographic hash of the first metadata object, generate, based on the second metadata object, a second NFT including a second link with the second metadata object, wherein the second NFT is encapsulated within a second control structure that restricts a second output of the second metadata object to a second remote device remote from the one or more processors, and wherein the second NFT digitally represents the first digital asset, update an NFT storage to include the first NFT and the second NFT, continuously monitor the physical asset based on collecting off-chain data from one or more off-chain data feeds, detect, by at least one of the first control structure or the second control structure, at least one attribute for outputting of the plurality of attributes for outputting is satisfied based on the off-chain data, in response to detecting the at least one attribute for outputting is satisfied, verify authenticity of at least a portion of the physical asset, and update the first NFT or the second NFT based on an output.

In some arrangements, each of the plurality of attributes are a geographic location on the proposed route of the physical asset.

In some arrangements, the second metadata object further stores a public and private key pair associated with a fungible value, and wherein the second control structure is configured to output the fungible value to a digital wallet in response to detecting the at least one attribute for outputting is satisfied.

In some arrangements, the NFT storage is a blockchain ledger, and wherein the fungible value is in a form of a digital currency, a digital form of a fiat currency, or a digital financial instrument for exchange.

In some arrangements, the data processing system further to encrypt the first metadata object to create the first cryptographic hash, update the first NFT in the NFT storage to include the first cryptographic hash, encrypt the second metadata object to create a second cryptographic hash, wherein the second metadata object includes the first cryptographic hash, and update the second NFT in the NFT storage to include the second cryptographic hash.

In some arrangements, the first digital asset is a software application installed on the physical asset, and wherein the software application includes at least one of a software version or source code.

In some arrangements, verifying the authenticity of at least the portion of the physical asset includes receiving a second digital asset of the physical asset, generating a third metadata object including an aggregation of the second digital asset and the first cryptographic hash of the first metadata object, encrypting the third metadata object to create a third cryptographic hash, wherein the third metadata object includes the first cryptographic hash, and verifying the authenticity of the first digital asset based on cross-referencing the third cryptographic hash with the second cryptographic hash stored in the NFT storage.

In some arrangements, verifying the authenticity of at least the portion of the physical asset includes receiving a first digital representation of the physical asset, wherein the first digital representation is at least one of an image, a scannable code, a video, or data received from a communication interaction, and analyzing the first digital representation based on collecting one or more content areas of the first digital representation and cross-referencing the one or more content areas with a second digital representation stored in the metadata of the physical asset.

In some arrangements, the first NFT is a data value composed of at least a first token identifier and a first contract number, wherein the first contract number identifies the first control structure that manages the first NFT.

In some arrangements, the data processing system further to output, from a first digital wallet address, a fungible asset or a non-fungible asset to a second digital wallet address in response to detecting the at least one attribute for outputting is satisfied and verifying the authenticity of at least the portion of the physical asset.

Some arrangements relate to a method to track provenance of assets utilizing non-fungible tokens (NFTs). The method includes receiving, by one or more processing circuits, a provenance request for a physical asset associated with a proposed route, generating, by the one or more processing circuits, a first metadata object including metadata of the physical asset and a plurality of attributes for outputting based on the proposed route, generating, by the one or more processing circuits based on the first metadata object, a first NFT including a first link with the first metadata object, wherein the first NFT is encapsulated within a first control structure that restricts a first output of the first metadata object to a first remote device remote from the one or more processors, and wherein the first NFT digitally represents the physical asset, generating, by the one or more processing circuits, a second metadata object including an aggregation of a first digital asset of the physical asset and at least one of the first NFT or a first cryptographic hash of the first metadata object, generating, by the one or more processing circuits based on the second metadata object, a second NFT including a second link with the second metadata object, wherein the second NFT is encapsulated within a second control structure that restricts a second output of the second metadata object to a second remote device remote from the one or more processors, and wherein the second NFT digitally represents the first digital asset, updating, by the one or more processing circuits, an NFT storage to include the first NFT and the second NFT, continuously monitoring, by the one or more processing circuits, the physical asset based on collecting off-chain data from one or more off-chain data feeds, detecting, by the one or more processing circuits executing at least one of the first control structure or the second control structure, at least one attribute for outputting of the plurality of attributes for outputting is satisfied based on the off-chain data, in response to detecting the at least one attribute for outputting is satisfied, verifying, by the one or more processing circuits, authenticity of at least a portion of the physical asset, and updating, by the one or more processing circuits, the first NFT or the second NFT based on an output.

In some arrangements, each of the plurality of attributes are a geographic location on the proposed route of the physical asset.

In some arrangements, the second metadata object further stores a public and private key pair associated with a fungible value, and wherein the second control structure is configured to output the fungible value to a digital wallet in response to detecting the at least one attribute for outputting is satisfied.

In some arrangements, the NFT storage is a blockchain ledger, and wherein the fungible value is in a form of a digital currency, a digital form of a fiat currency, or a digital financial instrument for exchange.

In some arrangements, the method further including encrypting, by the one or more processing circuits, the first metadata object to create the first cryptographic hash, updating, by the one or more processing circuits, the first NFT in the NFT storage to include the first cryptographic hash, encrypting, by the one or more processing circuits, the second metadata object to create a second cryptographic hash, wherein the second metadata object includes the first cryptographic hash, updating, by the one or more processing circuits, the second NFT in the NFT storage to include the second cryptographic hash.

In some arrangements, the first digital asset is a software application installed on the physical asset, and wherein the software application includes at least one of a software version or source code.

In some arrangements, verifying the authenticity of at least the portion of the physical asset includes receiving, by the one or more processing circuits, a second digital asset of the physical asset, generating, by the one or more processing circuits, a third metadata object including an aggregation of the second digital asset and the first cryptographic hash of the first metadata object, encrypting, by the one or more processing circuits, the third metadata object to create a third cryptographic hash, wherein the third metadata object includes the first cryptographic hash, and verifying, by the one or more processing circuits, the authenticity of the first digital asset based on cross-referencing the third cryptographic hash with the second cryptographic hash stored in the NFT storage.

In some arrangements, verifying the authenticity of at least the portion of the physical asset includes receiving, by the one or more processing circuits, a first digital representation of the physical asset, wherein the first digital representation is at least one of an image, a scannable code, a video, or data received from a communication interaction, and analyzing, by the one or more processing circuits, the first digital representation based on collecting one or more content areas of the first digital representation and cross-referencing the one or more content areas with a second digital representation stored in the metadata of the physical asset.

In some arrangements, the first NFT is a data value composed of at least a first token identifier and a first contract number, wherein the first contract number identifies the first control structure that manages the first NFT.

Some arrangements relate to a non-transitory computer readable medium including one or more instructions stored thereon and executable by a processor to receive a provenance request for a physical asset associated with a proposed route, generate a first metadata object including metadata of the physical asset and a plurality of attributes for outputting based on the proposed route, generate, based on the first metadata object, a first NFT including a first link with the first metadata object, wherein the first NFT is encapsulated within a first control structure that restricts a first output of the first metadata object to a first remote device remote from the one or more processors, and wherein the first NFT digitally represents the physical asset, generate a second metadata object including an aggregation of a first digital asset of the physical asset and at least one of the first NFT or a first cryptographic hash of the first metadata object, generate, based on the second metadata object, a second NFT including a second link with the second metadata object, wherein the second NFT is encapsulated within a second control structure that restricts a second output of the second metadata object to a second remote device remote from the one or more processors, wherein the second NFT digitally represents the first digital asset, update an NFT storage to include the first NFT and the second NFT, continuously monitor the physical asset based on collecting off-chain data from one or more off-chain data feeds, detect, by at least one of the first control structure or the second control structure, at least one attribute for outputting of the plurality of attributes for outputting is satisfied based on the off-chain data, in response to detecting the at least one attribute for outputting is satisfied, verify authenticity of at least a portion of the physical asset, and update the first NFT or the second NFT based on an output.

BRIEF DESCRIPTION OF THE DRAWINGS

These and other aspects and features of the present implementations will become apparent to those ordinarily skilled in the art upon review of the following description of specific implementations in conjunction with the accompanying figures, wherein.

DETAILED DESCRIPTION

Figure 1:
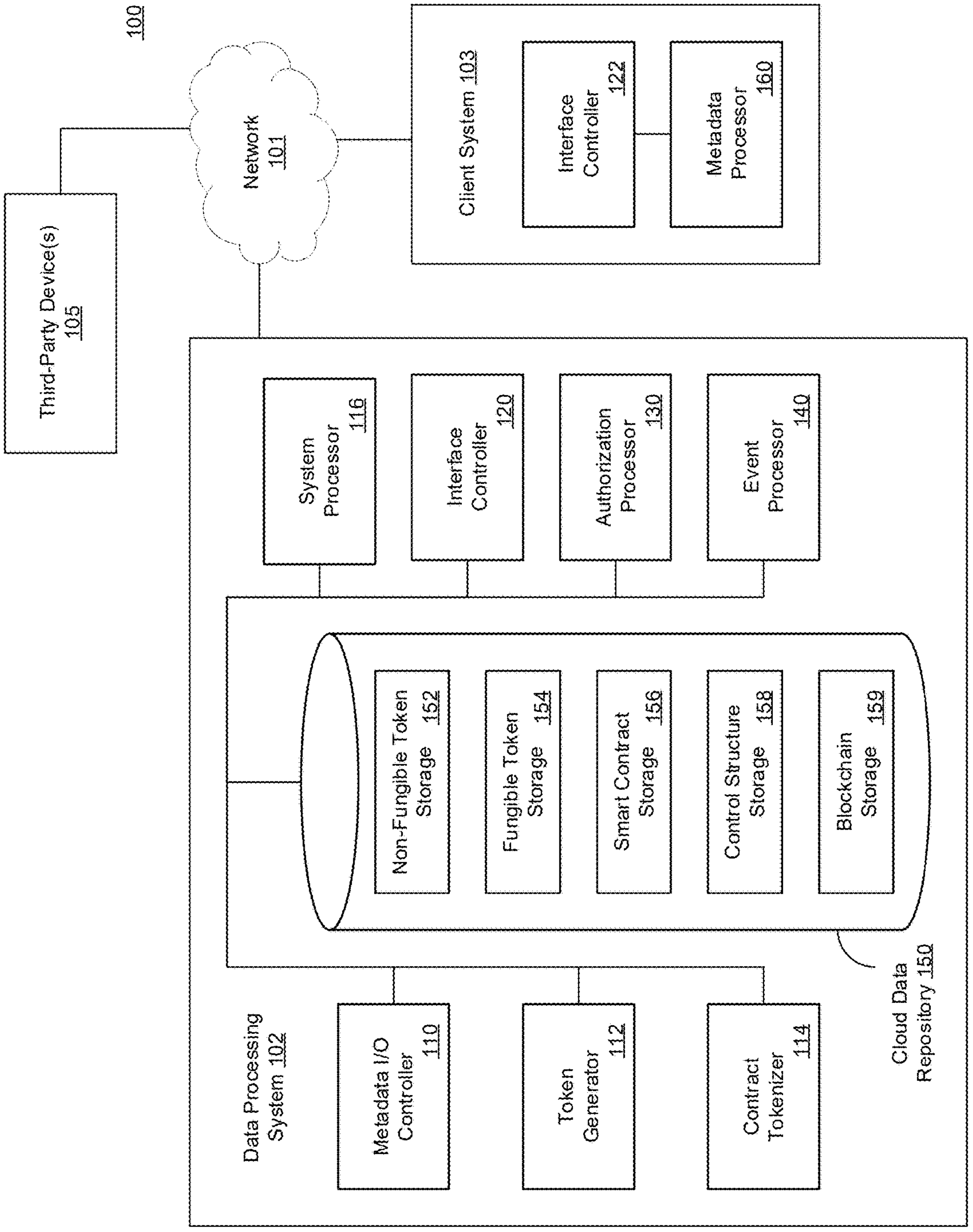
FIG. 1 illustrates a system in accordance with present implementations.

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

This technical solution can include a smart contract including a secure control structure that encapsulates one or more NFTs. The smart contract can allow output of various metadata objects linked to the NFTs upon detection of off-chain data satisfying one or more attributes for outputting. For example, the smart contract can be restricted to execution at a particular geographic location or computing environment by a secure NFT restricted to within the particular geographic location or computing environment. The smart contract, and the NFTs within the smart contract, can be rendered unusable outside the particular geographic location or computing environment. This technical solution can include multiple layers of secure access control to restricted NFTs, including authorization control at a smart contract layer by one or more tokens, and authorization control at a container layer by a private key. The private key can be based on one or more tokens, and can be fully contained within a single token or partially contained within multiple tokens. This technical solution can include generation of smart contracts and modification of blockchain architecture to restrict particular NFTs. For example, the system can generate or modify a smart contract to contain one or more particular NFTs. The system can search a blockchain to identify NFTs satisfying particular attributes or parameters. The parameters can be transmitted to the system, by a metadata parameter token. The system can generate a metadata token that can include a NFT, a semi-fungible token, or a fungible token, and can distribute that metadata token while retaining locally the smart contract and its restricted NFTs.

Accordingly, the systems described herein provide improvements over typical asset tracking systems or data storage/access system. That is, the technical problem that arises from typical asset tracking systems and data systems occurs when assets and data of the assets are transferred (e.g., physical or digitally) with minimal security or authorization checks. For example, when a physical asset (e.g., new product release) is sent from a country in Europe (e.g., origin) to a state in the United States (e.g., destination), the physical asset or digital may be tracked based on scanning a barcode at particular stops between the origin and destination (e.g., at a supplier, at customs, at another provider within the supply chain). However, in the following example, the asset itself and data stored in or on the physical or digital asset may be modified or changed (e.g., compromised) without knowledge of the asset tracking system or data storage/access system. For example, new product releases may be vulnerable to compromise (e.g., reverse engineering, source code stealing, product information, etc.) by hackers or competitors. Thus, to improve asset protection and data securitization, the technical solution is accomplished by obfuscating and protecting the assets (e.g., digital or virtual) utilizing an NFT that is restricted utilizing one or more particular control structures. This not only protects assets from hackers (or competitors) by reducing or eliminating the exposure or potential for manipulation of protected or private information of assets, but also protects entities and users from exposing their protected or private information (e.g., suppliers, origin, product information, source code, release dates), which is a significant improvement to the security and integrity of assets and data that are exchanged.

FIG. 1 illustrates a system in accordance with present implementations. As illustrated by way of example in FIG. 1, an example system 100 can include a network 101, a data processing system 102, and a client system 103. The network 101 can be any type or form of network. The geographical scope of the network 101 can vary widely and the network 101 can be a body area network (BAN), a personal area network (PAN), a local-area network (LAN), e.g., Intranet, a metropolitan area network (MAN), a wide area network (WAN), or the Internet. The topology of the network 101 can be of any form and can include, e.g., any of the following: point-to-point, bus, star, ring, mesh, or tree. The network 101 can be an overlay network which is virtual and sits on top of one or more layers of other networks 101. The network 101 can be of any such network topology as known to those ordinarily skilled in the art capable of supporting the operations described herein. The network 101 can utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite can include application layer, transport layer, internet layer (including, e.g., IPv6), or the link layer. The network 101 can be a type of a broadcast network, a telecommunications network, a data communication network, or a computer network. The data processing system 102 can include a metadata input and output (I/O) controller 110, a token generator 112, a contract tokenizer 114, a system processor 116, an interface controller 120, an authorization processor 130, an event processor 140, and a cloud data repository 150. The client system 103 can include a computing system located remotely from the data processing system 102. The client system 103 can include an interface controller 122 and a metadata processor 160.

The metadata I/O controller 110 can obtain one or more metadata objects. The metadata I/O controller 110 can communicate with one or more external systems via the network 101, and can obtain one or more metadata objects via the network 101. The metadata I/O controller 110 can generate metadata objects based on one or more output criteria that can be transmitted to a computing device, including, for example, the client system 103. The metadata I/O controller 110 can identify one or more characteristics of a metadata object. A characteristic can include, for example, a data type, an output data type, an input data type, or any combination thereof. For example, the metadata I/O controller 110 can obtain and identify metadata objects including video, audio, text, any media, executable programs, or any combination thereof. The metadata I/O controller 110 can transmit one or more of metadata objects or references or links with one or more metadata objects to the token generator 112.

The token generator 112 can generate one or more non-fungible tokens linked to particular metadata objects obtained from the metadata I/O controller 110. The token generator 112 can generate a token corresponding to a particular metadata object or metadata objects. The token generator 112 can obtain a preexisting token and can assign the preexisting token to a particular metadata object or metadata objects. The token generator 112 can generate a non-fungible token that is unique against all other tokens generated by the token generator 112 to identify metadata objects, a fungible token that can be generated or replicated an arbitrary number of times, and a semi-fungible token that can be generated or replicated a particular number of times below or meeting a particular replication threshold. One or more fungible tokens or semi-fungible tokens can, for example, be associated with a particular metadata object or the same metadata object. The token generator 112 can access the fungible token storage 154 to determine whether the replication threshold corresponding to a particular threshold is satisfied, and can block or forgo generation or replication of a token beyond or meeting the replication threshold in response to a determination that the replication threshold corresponding to a particular threshold is satisfied. The token generator 112 can transmit one or more of metadata objects or references or links with one or more metadata objects to the contract tokenizer 114, and can transmit one or more non-fungible tokens, fungible token, or semi-fungible tokens to the contract tokenizer 114.

The contract tokenizer 114 can generate one or more smart contracts that are executable to restrict output of one or more particular metadata objects based on one or more metadata objects. The system processor, for example, can execute smart contracts generated by the contract tokenizer 114. The contract tokenizer 114 can obtain one or more metadata objects and can generate a control structure corresponding to the metadata objects. For example, the contract tokenizer 114 can generate a control structure (e.g., metadata control structure) to encapsulate a plurality of metadata objects each associated with a particular metadata characteristic. The control structure can restrict access to the metadata objects within the control structure, by an encapsulation layer that, for example, encrypts all metadata objects within the control structure with a common encryption scheme. The encapsulation layer can control output of multiple metadata objects within the control structure by uniformly and concurrently decrypting the metadata objects according to the common encryption scheme. A metadata characteristic can include a type of output, a magnitude associated with the output, or any combination thereof, for example. For example, the metadata characteristic can include a periodic value increase in a metric of the metadata object, or can include a medic type associated with a media object. A media type can include, for example, video, audio, text, or any combination thereof. The contract tokenizer 114 can store one or more control structures can encapsulating one or more metadata objects in the control structure storage 158.

The contract tokenizer 114 can generate a smart contract based on one or more tokens and control structures. The contract tokenizer 114 can generate a smart contract including one or more executable instructions to restrict or transmit output of cone or more metadata objects encapsulated within a particular control structure. The contract tokenizer 114 can generate a smart contract that can conditionally transmit output of one or more of the metadata objects in response to detection of one or more attributes for outputting are satisfied (and/or verifying the authenticity of at least a portion of the physical asset). The tokens can include one or more non-fungible token, fungible tokens, and semi-fungible tokens. The contract tokenizer 114 can store the smart contract to the smart contract storage 156, and can link a token to the smart contract. The contract tokenizer 114 can publish, post, or append, for example, the token linked to the smart contract to a blockchain, and can publish, post, or append, for example, one or more tokens corresponding to the smart contract to a blockchain.

The system processor 116 can execute one or more instructions associated with the system 100. The system processor 116 can include an electronic processor, an integrated circuit, or the like including one or more of digital logic, analog logic, digital sensors, analog sensors, communication buses, volatile memory, nonvolatile memory, and the like. The system processor 116 can include, but is not limited to, at least one microcontroller unit (MCU), microprocessor unit (MPU), central processing unit (CPU), graphics processing unit (GPU), physics processing unit (PPU), embedded controller (EC), or the like. The system processor 116 can include a memory operable to store or storing one or more instructions for operating components of the system processor 116 and operating components operably coupled to the system processor 116. The one or more instructions can include at least one of firmware, software, hardware, operating systems, embedded operating systems, and the like. The system processor 116 or the system 100 generally can include at least one communication bus controller to effect communication between the system processor 116 and the other elements of the system 100.

The interface controller 120 can link the data processing system 102 with one or more of the network 101 and the client system 103 by one or more communication interfaces. A communication interface can include, for example, an application programming interface ("API") compatible with a particular component of the data processing system 102 or the data processing system 102. The communication interface can provide a particular communication protocol compatible with a particular component of the data processing system 102 and a particular component of the client system 103. The interface controller 120 can be compatible with particular metadata objects, and can be compatible with particular metadata delivery systems corresponding to particular metadata objects. For example, the interface controller 120 can be compatible with transmission of video metadata, audio metadata, or any combination thereof. For example, the interface controller 120 can be compatible with payment processing transmissions by a protocol compatible with payment processing latency and encryption structures.

The authorization processor 130 can validate one or more tokens against one or more smart contracts. The authorization processor 130 can obtain one or more tokens, and can compare one or more token to one or more tokens requested by a particular smart contract. The authorization processor 130 can detect whether a particular token is compatible with a particular smart contract by detecting whether a particular token matches a particular token characteristic associated with a particular smart contract. For example, the authorization processor 130 can detect that a token is compatible with a smart contract based on comparing a hash of the token with a hash included in the smart contract. The authorization processor 130 can generate an authorization indication based on one or more determinations, and can transmit the authorization indication to the event processor 140. The authorization processor 130 can, for example, provide a control structure or one or more metadata objects to the event processor 140, in response to the authorization indication, by decrypting the encapsulation layer of the control structure. The authorization processor 130 can, for example, execute the smart contract with the compatible tokens to retrieve a particular control structure for the smart contract, or a reference to the particular control structure, from the control structure storage 158.

The event processor 140 can execute one or more actions in response to an authorization indication generated by the authorization processor 140. The event processor 140 can, for example, provide output from particular metadata objects within a particular control structure, in response to receiving a control structure or reference to a control structure from the authorization processor 130.

The cloud data repository 150 can store data associated with the system 100. The cloud data repository 150 can include one or more hardware memory devices to store binary data, digital data, or the like. The cloud data repository 150 can include one or more electrical components, electronic components, programmable electronic components, reprogrammable electronic components, integrated circuits, semiconductor devices, flip flops, arithmetic units, or the like. The cloud data repository 150 can include at least one of a non-volatile memory device, a solid-state memory device, a flash memory device, and a NAND memory device. The cloud data repository 150 can include one or more addressable memory regions disposed on one or more physical memory arrays. A physical memory array can include a NAND gate array disposed on, for example, at least one of a particular semiconductor device, integrated circuit device, and printed circuit board device. The cloud data repository 150 can include a non-fungible token storage 152, a fungible token storage 154, a smart contract storage 156, a control structure storage 158, and a blockchain storage 159.

The non-fungible token storage 152 can store one or more NFTs and corresponding addresses for particular NFTs that indicate links with the corresponding NFT. The non-fungible token storage 152 can include NFTs associated with the data processing system 102 or any component thereof, the client system 103 or any component thereof, any metadata object, or any combination thereof. The fungible token storage 154 can store one or more fungible tokens and semi-fungible tokens. The fungible token storage 154 can store corresponding addresses for particular fungible tokens that indicate links with the corresponding fungible tokens, and can store corresponding addresses for particular semi-fungible tokens that indicate links with the corresponding semi-fungible tokens. The non-fungible token storage 152 can include fungible tokens and semi-fungible tokens associated with the data processing system 102 or any component thereof, the client system 103 or any component thereof, any metadata object, or any combination thereof.

The smart contract storage 156 can store one or more smart contracts and corresponding addresses for particular smart contracts that indicate links with the corresponding smart contracts. The control structure storage 158 can store one or more control structures and their contained metadata objects and corresponding addresses for particular control structures that indicate links with the corresponding control structures. The blockchain storage 159 can store one or more blockchains linked to one or more smart contracts, tokens, control structures, or metadata objects, by corresponding addresses for particular smart contracts, tokens, control structures, or metadata objects that indicate links with a particular blockchain.

The interface controller 122 can link the client system 103 with one or more of the network 101 and the data processing system 102 by one or more communication interfaces. A communication interface can include, for example, an application programming interface ("API") compatible with a particular component of the data processing system 102 or the data processing system 102. The communication interface can provide a particular communication protocol compatible with a particular component of the data processing system 102 and a particular component of the client system 103. The interface controller 120 can be compatible with particular metadata objects, and can be compatible with particular metadata delivery systems corresponding to particular metadata objects. For example, the interface controller 120 can be compatible with transmission of video metadata, audio metadata, or any combination thereof. For example, the interface controller 120 can be compatible with payment processing transmissions by a protocol compatible with payment processing latency and encryption structures. The communication interface of the client system 103 can be compatible with the communication interface of the data processing system 102 to perform unidirectional or bidirectional communication between the interface controllers 120 and 122.

The metadata processor 160 can execute one or more actions in response to an authorization indication generated by the authorization processor 140. The metadata processor 160 can, for example, receive output from particular metadata objects within a particular control structure, in response to receiving transmission by the interface controller 122 based on a control structure or reference to a control structure.

The one or more third-party devices 105 may be used by a third party with a relationship to the client system 103 or data processing system 102 (e.g., vendor, customer, entity, supplier, and so on) to perform various actions and/or access various types of data, some of which may be provided over network 101. The term "third party" as used herein may refer to an individual operating one or more third-party devices 105, interacting with resources or data via the third-party devices 105. The third-party devices 105 may be used to electronically transmit data (e.g., exchange requests, attributes) to the data processing system 102, to access websites (e.g., using a browser), the internet (e.g., using a mobile application), supply services, supply products, and to receive and/or transmit any other types of data (e.g., geographic location data of digital or physical assets, environment data of digital or physical assets). In some arrangements, third-party devices 105 can be configured to collect and provide environmental data to the data processing system 102. In various arrangements, the third-party devices 105 may also be used to electronically transmit data to the client system 103, and can be configured to receive and/or transmit any other types of data. For example, a third party may be a supplier of a software application installed on a physical asset. In another example, a third party may be a supply chain or logistics company that transfers physical and digital assets. The third-party device 105 (sometimes referred to herein as a "computing system") may be a mobile computing device, desktop computer, smartphone, tablet, smart watch, smart sensor, or any other device configured to facilitate receiving, displaying, and interacting with content (e.g., web pages, mobile applications, etc.). Third-party device 105 may also include an input/output circuit for communicating data over network 101 to data processing system 102 and client system 103. In some arrangements, each third-party device 105 can have a digital wallet address or exchanging (e.g., receiving or sending) fungible or non-fungible values (e.g., cryptocurrency, digital currency, stocks, bonds, loan, deed, etc.).

Figure 2:
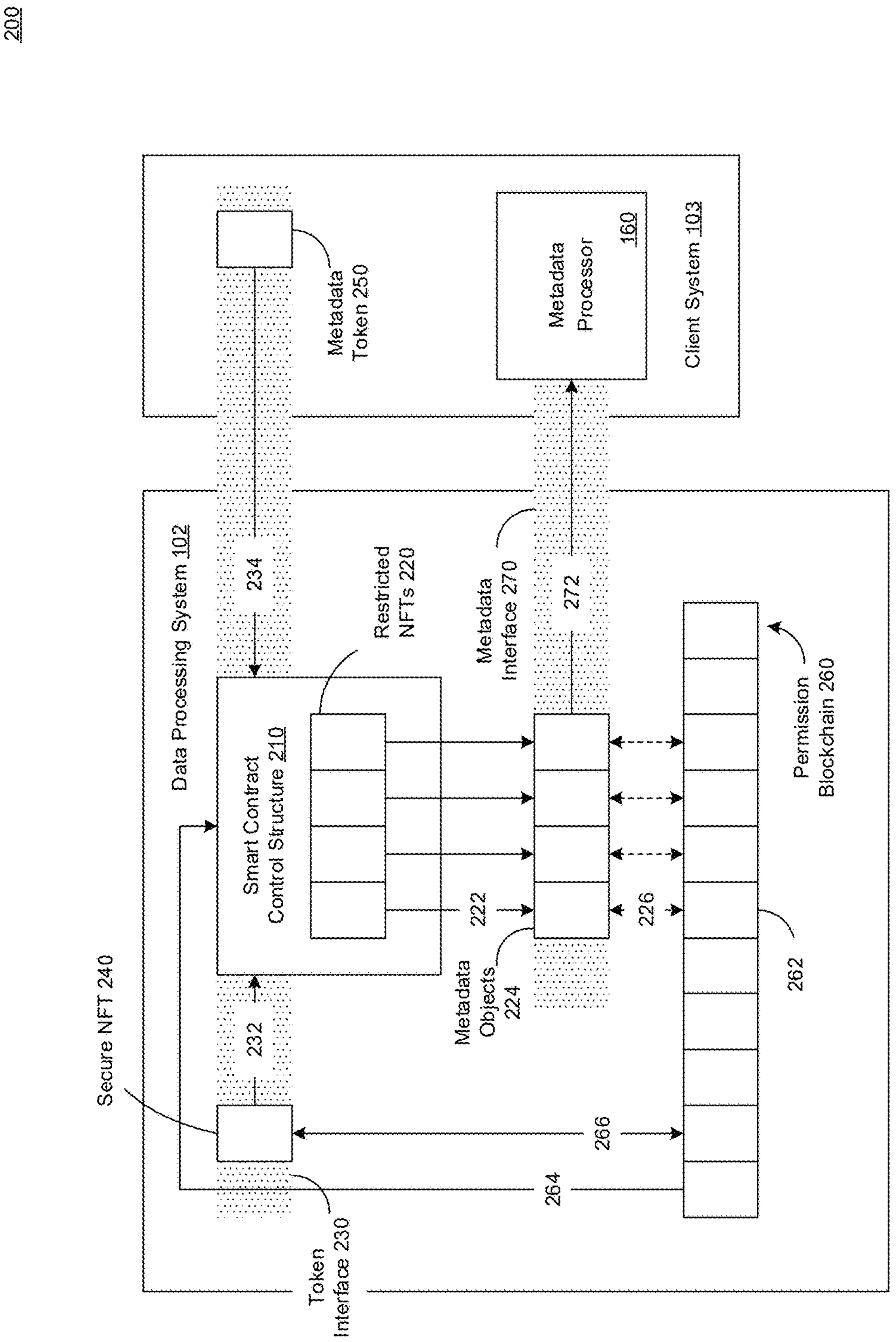
FIG. 2 illustrates an architecture in accordance with present implementations.

FIG. 2 illustrates an architecture in accordance with present implementations. As illustrated by way of example in FIG. 2, an example architecture 200 can include the data processing system 102 and the client system 103. The architecture 200 can include the metadata processor 160, a smart contract control structure 210, one or more restricted NFTs 220, one or more metadata links 222, one or more metadata objects 224, one or more blockchain links 226, a token interface 230, a security link 232, a client link 234, a secure NFT 240, a metadata token 250, a permission blockchain 260 with one or more blocks 262, a control link 264, a secure NFT link 266, a metadata interface 270, and a metadata link 272. A link as discussed herein can correspond to or include metadata. The metadata can, for example, be stored within or integrated with any smart contract, smart contract control structure, metadata object, block, blockchain, or any combination thereof.

The smart contract control structure 210 can include one or more instructions to restrict and transmit output of one or more of the metadata objects 224. The smart contract control structure 210 can correspond to an executable smart contract and can include a gateway component. The gateway component can include one or more instructions to restrict or prevent output of the restricted NFTs 220 in the absence of presence of one or more tokens compatible with the smart contract control structure 210. The smart contract control structure 210 can include an encapsulation layer that (shown as metadata control structure 330), for example, maintains the restricted NFTs in an encrypted state. The smart contract control structure 210 can permit access to the restricted NFTs based on a private key, for example, compatible with the encapsulation layer and operable to decrypt the encryption corresponding to the encapsulation layer. The gateway component can be compatible with and interface with the token interface 230, and the encapsulation layer can be integrated with the smart contract control structure 210.

The restricted NFTs 220 can each include a particular NFT and can correspond to particular metadata objects. A restricted NFT can be associated with a particular metadata object, and can be required to transmit output of the metadata object, transfer the metadata object to another storage location, or any combination thereof, for example. Each of the restricted NFTs 220 can indicate control of a particular metadata object of the metadata objects 224 by a corresponding metadata link of the metadata links 222. The metadata links 222 can include a reference, pointer, or the like, to or between each restricted NFT and each metadata object associated with that particular restricted NFT.

The metadata objects 224 can each include a particular data or instructions. A metadata objects can correspond to a collections of executable instructions or data that can be finite. For example, a metadata object can include a video file corresponding to a limited number of instances of video metadata. For example, a metadata object can include an audio file corresponding to a limited number of instances of audio metadata. For example, a metadata object can include a metric that increases with limited capacity, such as a physical measurement a financial instrument valuation, a periodic output based on a physical or scarce property, or any combination thereof.

The token interface 230 can include a communication channel between one or more of the smart contract control structure 210, the secure NFT at the data processing system 102, and the metadata token 250 at the client system 103. The token interface 230 can include an application programming interface compatible with the smart contract control structure 210 to detect the secure NFT at the data processing system 102, and the metadata token 250 at the client system 103. At least the token interface 230 or the smart contract control structure 210 can execute one or more instructions to determine whether one or more of the secure NFT 240 and the metadata token 250 are compatible with the smart contract control structure 210. The security link 232 can include a transmission path or communication path between the secure NFT 240 and the smart contract control structure 210 by the token interface 230. At least the token interface 230 or the smart contract control structure 210 can detect the secure NFT 240 via the security link 232. The client link 234 can include a transmission path or communication path between the metadata token 250 and the smart contract control structure 210 by the token interface 230. At least the token interface 230 or the smart contract control structure 210 can detect the metadata token 250 via the client link 234.

The secure NFT 240 can include an NFT associated with and controlled by the data processing system 102. Transmission of the secure NFT 240 can be restricted by the data processing system 102 to within the data processing system 102. For example, the secure NFT 240 can correspond to a "backup key" or "house key" that must be detected in order to the smart contract control structure 210 transmit output of the metadata objects 224 corresponding to the restricted NFTs 220. Thus, the secure NFT 240 can restrict authorization by the smart contract control structure 210 to the data processing system 102 environment. The metadata token 250 can include a token associated with and controlled by the client system 103. The metadata token 250 can include a fungible token or a semi-fungible token. For example, the metadata token 250 can include a fungible token to obtain output of a collection of freely accessible metadata objects 224. For example, the metadata token 250 can include a semi-fungible token to obtain output of a collection of metadata objects 224 accessible under limited conditions. Limited conditions can include metadata objects accessible by subscription. Transmission of the metadata token 250 can be restricted by the client system 103 to within the data processing system 102.

The permission blockchain 260 can include at least one blockchain including one or more of the blocks 262. The permission blockchain 260 can be linked to one or more metadata objects 224, secure NFTs 240, and smart contract control structures 210. The permission blockchain 260 can include a blockchain operated and controlled at the data processing system 102. The permission blockchain 260 can include a plurality of blockchains each corresponding to particular aspects of the links associated with the corresponding blockchains. The blocks 262 can include or store links to one or more objects associated with the blockchain. The blockchain links 226 can include a reference, pointer, or the like, to or between a block among the blocks 262 and a metadata object associated with that particular block. The control link 264 can include a reference, pointer, or the like, to or between a block among the blocks 262 and the smart contract control structure 210 associated with that particular block. The secure NFT link 266 can include a reference, pointer, or the like, to or between a block among the blocks 262 and the secure NFT 240 associated with that particular block.

The metadata interface 270 can include a communication channel between one or more of the metadata objects 224 at the data processing system 102, and the metadata processor 160 at the client system 103. The metadata interface 270 can include an application programming interface compatible with the metadata objects 224 to transmit data or instructions based on the metadata objects 224 to the metadata processor 160 of the client system 103. At least the metadata interface 270 or the metadata processor 160 can execute one or more instructions to obtain output of the metadata objects 224. The metadata link 272 can include a transmission path or communication path between the metadata objects 224 and the metadata processor 160 by the metadata interface 270. At least the metadata interface 270 or the metadata processor 160 can obtain output of the metadata objects 224 via the metadata link 272.

Figure 3:
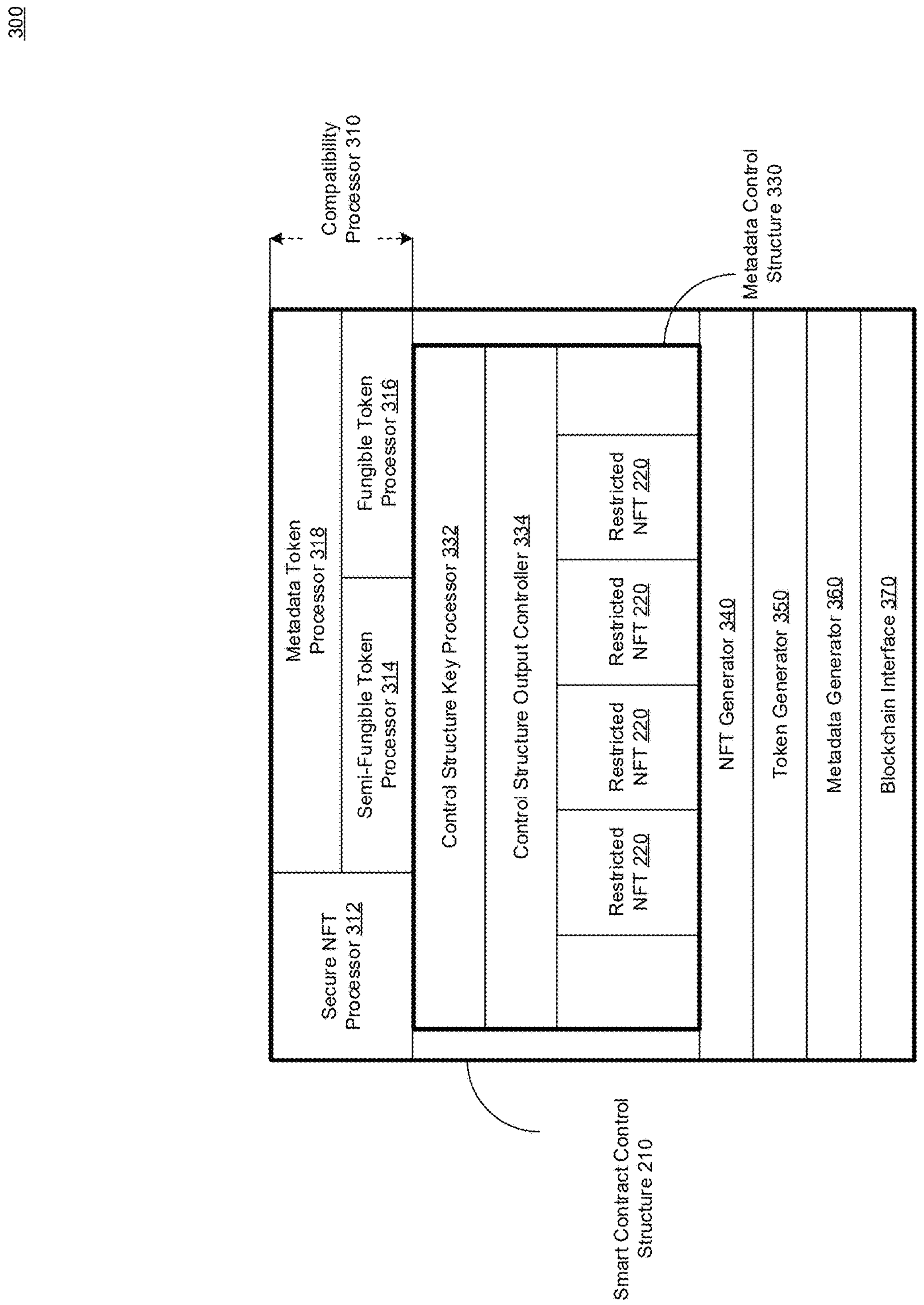
FIG. 3 illustrates a smart contract control architecture in accordance with present implementations.

FIG. 3 illustrates a smart contract control architecture in accordance with present implementations. As illustrated by way of example in FIG. 3, an example architecture 300 can include the smart contract control structure 210. The smart contract control structure 210 can include a compatibility processor 310, a smart contract output controller 320, a metadata control structure 330, an NFT generator 340, a token generator 350, a metadata generator 360, and a blockchain interface 370.

The compatibility processor 310 can communication with and validate one or more tokens. The compatibility processor 310 can include one or more interfaces corresponding to an API or a smart contract interface, for example. A smart contract interface can include one or more executable instructions integrated with a smart contract. The smart contract interface can execute instructions at the smart contract or triggered by the smart contract in response to detection of objects or conditions external to the smart contract. The compatibility processor 310 can comprise at least a portion of a control structure of the smart contract. The compatibility processor 310 can include a control structure. The compatibility processor 310 can include a secure NFT processor 312, a semi-fungible token processor 314, a fungible token processor 316, and a metadata token processor 318.

The secure NFT processor 312 can detect the presence of a secure NFT 240, and can determine whether the secure NFT 240 is compatible with the secure NFT processor 312. The secure NFT processor 312 can be configured to be compatible with a particular secure NFT 240, or can be generated to be compatible with a particular secure NFT 240. For example, the secure NFT processor 312 can be integrated with or store a hash based on a particular secure NFT 240 and a hash processor operable to generate a hash based on any secure NFT 240. The secure NFT processor 312 can generate a hash in response to detecting the presence of the secure NFT 240, and can determine whether the secure NFT 240 is compatible with the smart contract control structure, in response generating the hash, by comparting the generated hash with the stored hash. The secure NFT processor 312 can include logic to detect a secure NFT 240 passed to it, by, for example, a JSON object or a header argument.

The semi-fungible token processor 314 can detect the presence of a semi-fungible token, and can determine whether the semi-fungible token is compatible with the semi-fungible token processor 314. The semi-fungible token processor 314 can be configured to be compatible with a particular semi-fungible token, or can be generated to be compatible with a particular semi-fungible token. The semi-fungible token processor 314 can be configured to be compatible with a plurality of tokens having a particular characteristic, or can be generated to be compatible with a plurality of tokens having a particular characteristic. A particular characteristic can include, for example, a particular identifier or portion of an identifier of a token. For example, the semi-fungible token processor 314 can be integrated with or store a hash based on a particular semi-fungible token and a hash processor operable to generate a hash based on any semi-fungible token. The semi-fungible token processor 314 can generate a hash in response to detecting the presence of the semi-fungible token, and can determine whether the semi-fungible token is compatible with the smart contract control structure 210, in response generating the hash, by comparing the generated hash with the stored hash. The semi-fungible token processor 314 can include logic to detect a semi-fungible token passed to it, by, for example, an activation instruction from the metadata token processor 318.

The fungible token processor 316 can detect the presence of a fungible token, and can determine whether the fungible token is compatible with the fungible token processor 316. The fungible token processor 316 can be configured to be compatible with a particular fungible token, or can be generated to be compatible with a particular fungible token. The fungible token processor 314 can be configured to be compatible with a plurality of tokens having a particular characteristic, or can be generated to be compatible with a plurality of tokens having a particular characteristic. A particular characteristic can include, for example, a particular identifier or portion of an identifier of a token. For example, the fungible token processor 316 can be integrated with or store a hash based on a particular fungible token and a hash processor operable to generate a hash based on any fungible token. The fungible token processor 316 can generate a hash in response to detecting the presence of the fungible token, and can determine whether the fungible token is compatible with the smart contract control structure 210, in response generating the hash, by comparing the generated hash with the stored hash. The fungible token processor 316 can include logic to detect a fungible token passed to it, by, for example, an activation instruction from the metadata token processor 318.

The metadata token processor 318 can detect the presence of a semi-fungible token or a fungible token, and can transmit the semi-fungible token or the fungible token respectively to the semi-fungible token processor 314 or the fungible token processor 316. The fungible token processor 316 can be configured to be compatible with any semi-fungible fungible token or fungible token, or can be generated to be compatible with any semi-fungible token or fungible token. The fungible token processor 316 can be configured to identify a semi-fungible fungible token or a fungible token, or can be generated to identify any semi-fungible token or fungible token. For example, the metadata token processor 318 can identify a particular identifier or portion of an identifier of a token to determine whether the token includes a semi-fungible token or a fungible token. The metadata token processor 318 can transmit the token to the semi-fungible token processor 314 in response to a determination that the token includes a semi-fungible token. The metadata token processor 318 can transmit the token to the fungible token processor 314 in response to a determination that the token includes a fungible token. For example, the metadata token processor 318 can detect a semi-fungible metadata token 250 corresponding to limited-release metadata or assets, and can detect a fungible metadata token 250 corresponding to wide-release metadata or assets.

The smart contract output controller 320 can selectively transmit output from one or more of the restricted NFTs 220 based on determinations from one or more of the secure NFT processor 312, the semi-fungible token processor 314, and the fungible token processor 316. For example, the smart contract output controller 320 can include a communication channel and a control structure to activate or deactivate the communication channel. The communication channel can communicatively couple the metadata control structure 330 with a communication interface external to the smart contract control structure. For example, the smart contract output controller 320 can activate the communication channel in response to a determination that a secure NFT 240 and a metadata token 250 are both compatible with the smart contract control structure 210.

The metadata control structure 330 can include a security layer that restrict access to one or more of the restricted NTFs 220. The metadata control structure 330 can include, for example, a security encapsulation that partially or completely encrypts one or more components of the metadata control structure 330. The metadata control structure 330 can include a control structure key processor 332, a control structure output controller 334, and one or more of the restricted NFTs 220.

The control structure key processor 332 can detect the presence of a private key, and can determine whether the private key is compatible with the metadata control structure 330. The control structure key processor 332 can obtain the private key from one or more of the non-fungible token, a semi-fungible token or a fungible token, and can transmit the semi-fungible token or the fungible token respectively to the semi-fungible token processor 314 or the fungible token processor 316. For example, the private key can be stored entirely within the metadata token 250. For example, the private key can be stored entirely within the secure NFT 240, to restrict output from the control structure to the logical location corresponding to the secure NFT 240. For example, the private key can be stored partially within the secure NFT 240 and partially within the metadata token 250, to restrict output from the control structure to the logical location corresponding to the secure NFT 240 by a distributed key.

The control structure output controller 334 can selectively transmit output from one or more of the restricted NFTs 220 based on determinations from the control structure key processor 332. For example, the control structure output controller 334 can include a communication channel and a control structure to activate or deactivate the communication channel. The communication channel can communicatively couple the restricted NFTs 220 with smart contract output controller 320. For example, the control structure output controller 334 can activate the communication channel in response to a determination that the private key is compatible with the control structure key processor 332.

The NFT generator 340 can generate one or more NFTs in accordance with a metadata objected. For example, the NFT generator 340 can generate multiple NFTs based on a number of new metadata objects or NFTs indicated by an obtained token. For example, the NFT generator 340 can generate one or more NFTs each including a link or a reference to a parent (or primary) NFT (e.g., one restricted NFT 220) to identify a source NFT corresponding to the NFT minted by the NFT generator 340 (e.g., for a physical asset). For example, the NFT generator 340 can generate one or more NFTs each including a link or a reference to an NFT from which the new NFTs are minted. Thus, the NFT generator can provide a technical improvement of validating a minting of an NFT based on a provenance parameter embedded in the NFT. The provenance parameter can include a hash of the parent NFT or the NFT from which the new NFTs are minted, for example. Generating an NFT and minting an NFT can be used interchangeably.

The token generator 350 can generate one or more tokens in accordance with a NFT or control structure. For example, the token generator 350 can generate multiple tokens based on a number of new metadata objects or NFTs indicated by an obtained NFT token, and linked with respective smart contract control structures. For example, the token generator 350 can generate one or more content tokens each linked with a particular smart contract control structure 210 with which the respective token is compatible. The token generator 350 can thus generate a corresponding number of "owner keys" or "consumer keys" or "public and private key pairs" that can control restrictions on output by the particular metadata object linked with the particular smart contract control structure 210 compatible with the particular token. The token generator 350 can modify and delete tokens linked with primary NFTs or parent smart contract control structures, to update control of a partial transfer of metadata object control. For example, the token generator 350 can create a token controlling 25% of shares of a physical asset, and modify a token originally controlling 100% of the physical asset to link with a smart contract control structure controlling 75% of the physical asset. The token generator 350 can make the modification in accordance with an example for a change in control of 25% of a physical asset controlled by the original token holder.

The metadata generator 360 can generate one or more metadata objects in accordance with a received provenance request with a proposed route and third-party data (e.g., various data sources). For example, metadata generator 360 can generate multiple NFTs based on a number of new metadata objects indicated by the provenance request, and linked with respective smart contract control structures. For example, the metadata generator 360 can generate one or more metadata objects each linked with a particular smart contract control structure 210 by which the respective metadata object is controlled. The metadata generator 360 can modify and delete metadata objects linked with NFTs or smart contract control structures, to update control of a partial transfer of metadata object control.

The blockchain interface 370 can include an API compatible with the permission blockchain 260. The blockchain interface 370 can selectively add, modify, and delete blocks from the permission blockchain 260. The blockchain interface 370 can add, modify, and delete blocks in accordance with restrictions or interfaces of the permission blockchain 260, and can add, modify, and delete blocks independently of the restrictions or interfaces of the permission blockchain 260 at any portion or index of the permission blockchain 260.

Figure 4:
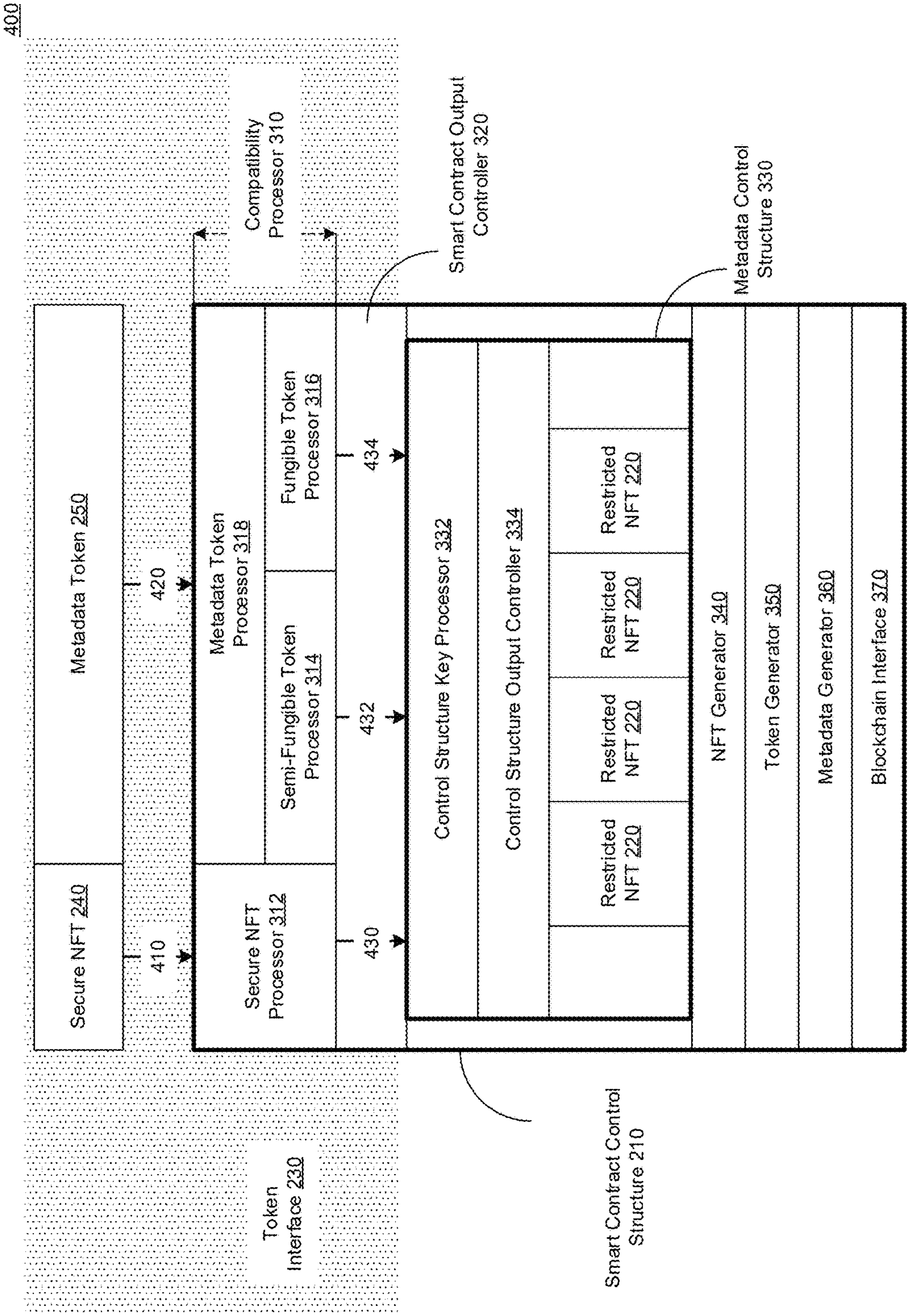
FIG. 4 illustrates a smart contract control architecture and a token interface, in accordance with present implementations.

FIG. 4 illustrates a smart contract control architecture and a token interface, in accordance with present implementations. As illustrated by way of example in FIG. 4, an example architecture 400 can include the smart contract control structure 210 and the token interface 230. The smart contract control structure 210 can include the compatibility processor 310, the smart contract output controller 320, and the metadata control structure 330. The token interface 230 can perform detection 410 of the secure NFT 240, detection 420 of the metadata token 250, and one or more of detection 430 of the secure NFT or a portion thereof at the metadata control structure 330, detection 432 of a semi-fungible token at the metadata control structure 330, and detection 434 of a fungible token at the metadata control structure 330.

The detection 410 can be responsive to an action by the token interface 230 to transmit the secure NFT 240 to the smart contract control structure 210. The secure NFT processor 312 can detect the secure NFT 240 obtained by the smart contract control structure 210 via the token processor 230. The detection 420 can be responsive to an action by the token interface 230 to transmit the metadata token 250 to the smart contract control structure 210. The metadata token processor 318 can detect the metadata token 250 obtained by the smart contract control structure 210 via the token processor 230.

The detection 430 can be responsive to an action by the secure NFT processor 312 to transmit the secure NFT 240 to the control structure key processor 332. The control structure key processor 332 can detect the secure NFT 240 obtained by the smart contract control structure 210 via the secure NFT processor 312. The detection 432 can be responsive to an action by semi-fungible token processor 314 to transmit the metadata token 250 to the control structure key processor 332. The control structure key processor 332 can detect the metadata token 250 obtained by the smart contract control structure 210 via the semi-fungible token processor 314. The detection 434 can be responsive to an action by fungible token processor 316 to transmit the metadata token 250 to the control structure key processor 332. The control structure key processor 332 can detect the metadata token 250 obtained by the smart contract control structure 210 via the fungible token processor 316. The control structure key processor 332 can obtain a private key based on one or more of the obtained secure NFT 240 and the obtained metadata token 250.

Figure 5:
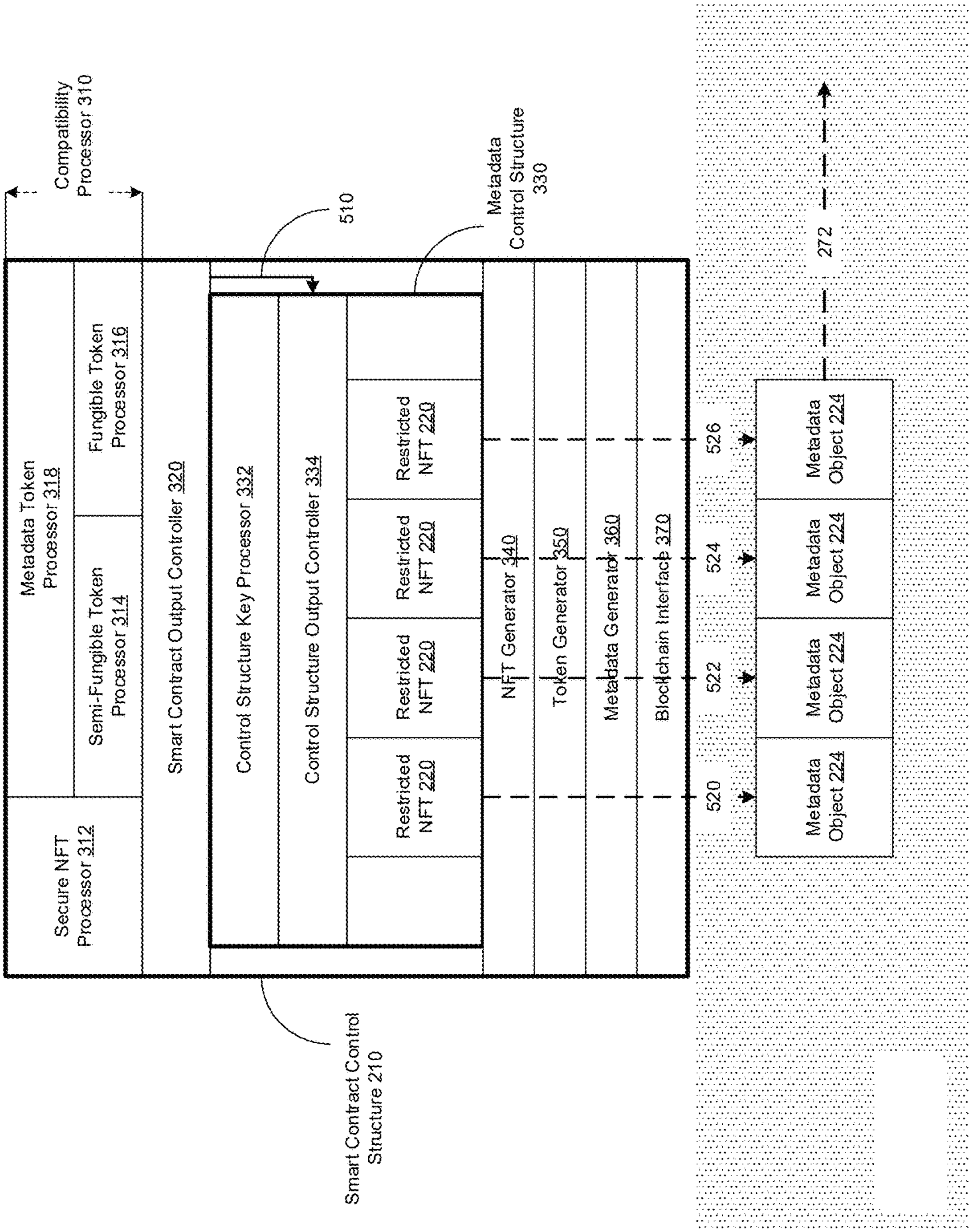
FIG. 5 illustrates a smart contract control architecture and a metadata interface, in accordance with present implementations.

FIG. 5 illustrates a smart contract control architecture and a metadata interface, in accordance with present implementations. As illustrated by way of example in FIG. 5, an example architecture 500 can include the smart contract control structure 210 and the metadata interface 270. The smart contract control structure 210 can include the compatibility processor 310, the smart contract output controller 320, and the metadata control structure 330. The metadata interface 270 can perform activation 510 of the control structure output controller 334, and one or more of the activations 520, 522, 524 and 526 of one or more of the metadata objects 224 respectively linked to one or more of the corresponding restricted NFTs 220.

The activations 520, 522, 524 and 526 can be responsive to an action by one or more of the smart contract output controller 320 and the control structure output controller 334 to transmit the output of metadata objects 224 corresponding to the restricted NFTs 220. For example, the smart contract control structure can transmit output of video metadata of the metadata objects 224 to the client system 103 in response to validating the metadata token 250 obtained from the client system 103 by the token interface 230. For example, the smart contract control structure can transmit payment of financial, equity, derivative, cash, or crypto assets of the metadata objects 224 to the client system 103 in response to validating the metadata token 250 obtained from the client system 103 by the token interface 230.

Figure 6:
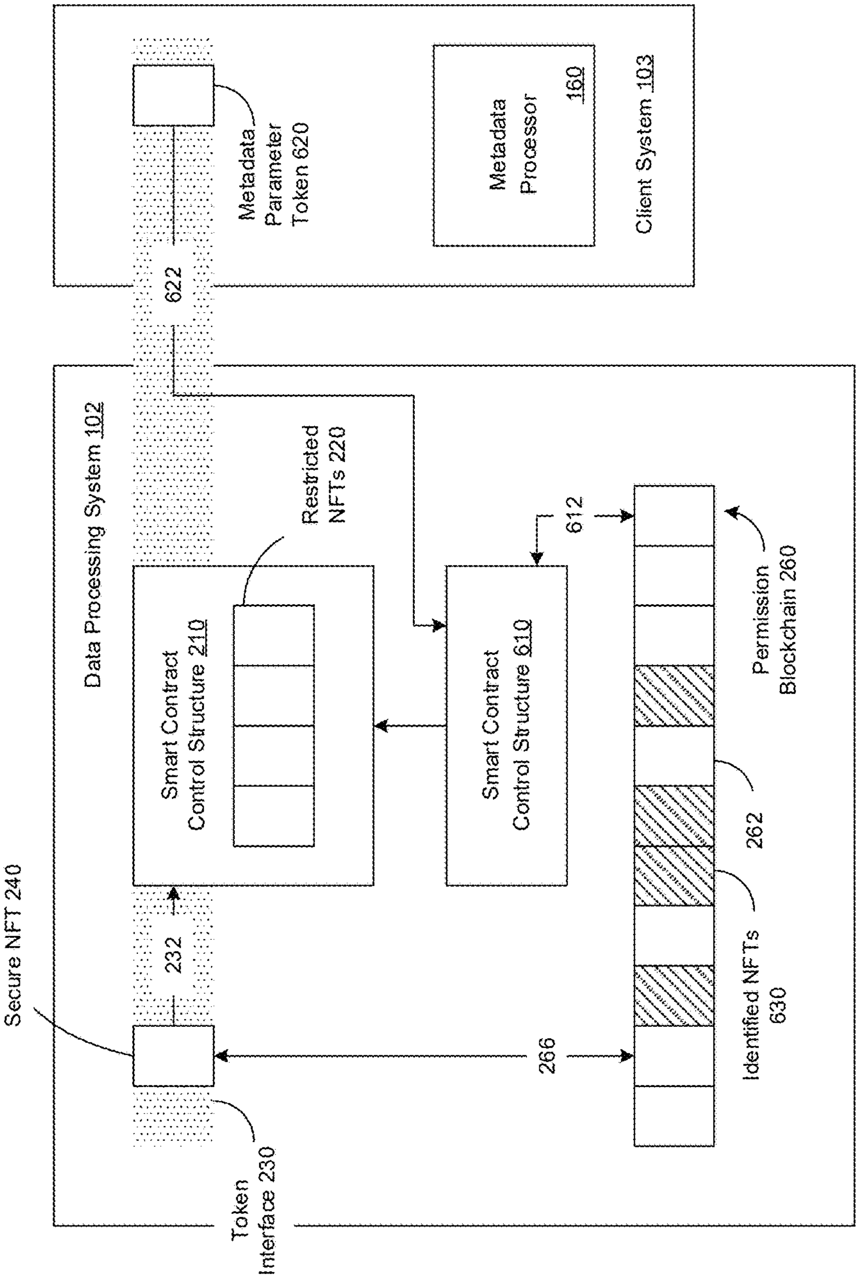
FIG. 6 illustrates a smart contract control architecture, in accordance with present implementations.

FIG. 6 illustrates a smart contract control architecture, in accordance with present implementations. As illustrated by way of example in FIG. 6, an example architecture 600 can include the data processing system 102 and the client system 103. The architecture 600 can include the metadata processor 160, the smart contract control structure 210, the restricted NFTs 220, the token interface 230, the security link 232, the secure NFT 240, the permission blockchain 260 with the blocks 262, the secure NFT link 266, a smart contract control structure 610, a blockchain control link 612, a metadata parameter token 620, a client link 622, and one or more identified NFTs 630.

The smart contract control structure 610 can include one or more instructions to generate or modify the smart contract control structure 210. The smart contract control structure 610 can correspond to an executable smart contract and can include a gateway component. The gateway component can include one or more instructions to restrict or prevent execution of the smart contract control structure 610 in the absence of presence of one or more tokens compatible with the smart contract control structure 610. The smart contract control structure 210 can generate or modify the smart contract control structure 210 based on a predetermined private key. The smart contract control structure 610 can be compatible with the permission blockchain 260 and can modify the permission blockchain 260 by the blockchain control link 612. The blockchain control link 612 can directly or indirectly address or link to one or more of the blocks 262.

The metadata parameter token 620 can include an NFT, a fungible token or a semi-fungible token. For example, the metadata parameter token 620 can include an NFT that identifies one or more metadata parameters of one or more metadata objects 224. For example, metadata parameters can include a metadata identifier, source identifier, publisher identifier, metadata media type, asset identifier, asset type, metadata output type, asset output type, asset payment type, asset payment periodicity, asset class, or any combination thereof. For example, the metadata parameter token 620 can identify all metadata objects corresponding to episodes of a particular season of a particular television show. For example, the metadata parameter token 620 can identify all metadata objects corresponding to shares of a particular equity having a price per share within a particular range and a particular dividend payment processing schedule. The client link 622 can include a transmission path or communication path between the metadata parameter token 620 and the smart contract control structure 610 by the token interface 230. At least the token interface 230 or the smart contract control structure 610 can detect the metadata parameter token 620 via the client link 622.

The identified NFTs 630 can correspond to one or more metadata objects having or corresponding to particular metadata parameters. The identified NFTs 630 be linked to one or more metadata objects 224 having output to be restricted. The smart contract control structure 610 can modify the permission blockchain 260 via the blockchain control link 612 to restrict one or more of the identified NFTs 630 at the permission blockchain 260. For example, the smart contract control structure 610 can remove the identified NFTs 630 from the blockchain and replace the links to the identified NFTs 630 with links to the smart contract control structure 210. The smart contract control structure 610 can transfer, for example, the identified NFTs 630 to the smart contract control structure 210 to convert the identified NFTs 630 to the restricted NFTs 220. The smart contract control structure 610 can replicate, for example, the identified NFTs 630 at the smart contract control structure 210 to convert the identified NFTs 630 to the restricted NFTs 220.

Figure 7:
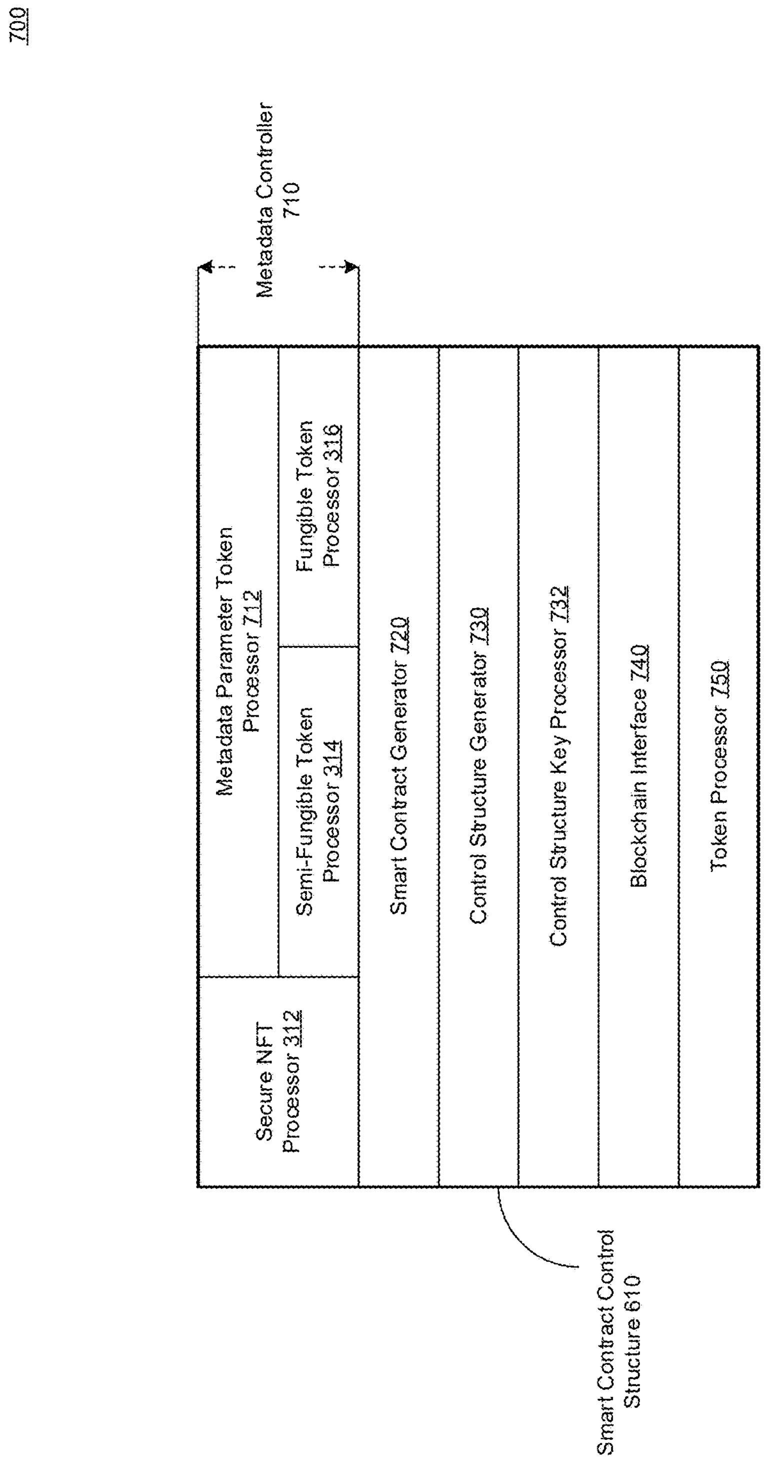
FIG. 7 illustrates a smart contract control architecture, in accordance with present implementations.

FIG. 7 illustrates a smart contract control architecture, in accordance with present implementations. As illustrated by way of example in FIG. 7, an example architecture 700 can include the smart contract control structure 610. The smart contract control structure 610 can include a metadata controller 710, a smart contract generator 720, a control structure generator 730, a control structure key processor 732, a blockchain interface 740, and a token processor 750.

The metadata controller 710 can comprise at least a portion of a control structure of the smart contract. The metadata controller 710 can include a control structure. The metadata controller 710 can include the secure NFT processor 312, the semi-fungible token processor 314, the fungible token processor 316, and a metadata parameter token processor 712.

The metadata parameter token processor 712 can detect the presence of a semi-fungible token or a fungible token, and can transmit the semi-fungible token or the fungible token respectively to the semi-fungible token processor 314 or the fungible token processor 316. The fungible token processor 316 can be configured to be compatible with any semi-fungible fungible token or fungible token, or can be generated to be compatible with any semi-fungible token or fungible token. The fungible token processor 316 can be configured to identify a semi-fungible fungible token or a fungible token, or can be generated to identify any semi-fungible token or fungible token. For example, the metadata token processor 318 can identify a particular identifier or portion of an identifier of a token to determine whether the token includes a semi-fungible token or a fungible token. The metadata parameter token processor 712 can transmit the token to the semi-fungible token processor 314 in response to a determination that the token includes a semi-fungible token. The metadata parameter token processor 712 can transmit the token to the fungible token processor 314 in response to a determination that the token includes a fungible token. For example, the metadata parameter token processor 712 can detect a semi-fungible metadata parameter token 620 issued to a limited number of user or client systems, and can detect a fungible metadata parameter token 620 issued without restriction to an unlimited or arbitrary number of user or client systems.

The smart contract generator 720 can generate a smart contract and control structures of the smart contract based on one or more of the metadata parameter token 620 and the secure NFT 240. The smart contract generator 720 can generate a smart contract compatible with the identified NFTs 630 and restricted to output based on detection of the secure NFT 240. The control structure generator 730 can generate a control structure embedded within a smart contract, and control structures of the control structure, based on one or more of the metadata parameter token 620 and the secure NFT 240. The control structure generator 730 can generate a control structure encapsulating the identified NFTs 630 and restricted to output based on detection of the secure NFT 240. The control structure key processor 732 can generate a private key compatible with a control structure generated by the control structure generator 730, based on one or more of the metadata parameter token 620 and the secure NFT 240. The control structure key processor 732 can generate a private key to encrypt the encapsulation including the identified NFTs 630 and restricted to output based on detection of the secure NFT 240. The blockchain interface 740 can be compatible with the permission blockchain 260. The smart contract control structure 610 can modify the permission blockchain 260 by the blockchain interface 740. The blockchain interface 740 can include an API compatible with the permission blockchain 260. The token processor 750 can generate a metadata token compatible with a control structure generated by the control structure generator 730 and a smart contract generated by the smart contract generator 720, based on one or more of the metadata parameter token 620 and the secure NFT 240. The token processor 750 can transmit the metadata token to one or more client systems, or can maintain the metadata token at the data processing system.

Figure 8:
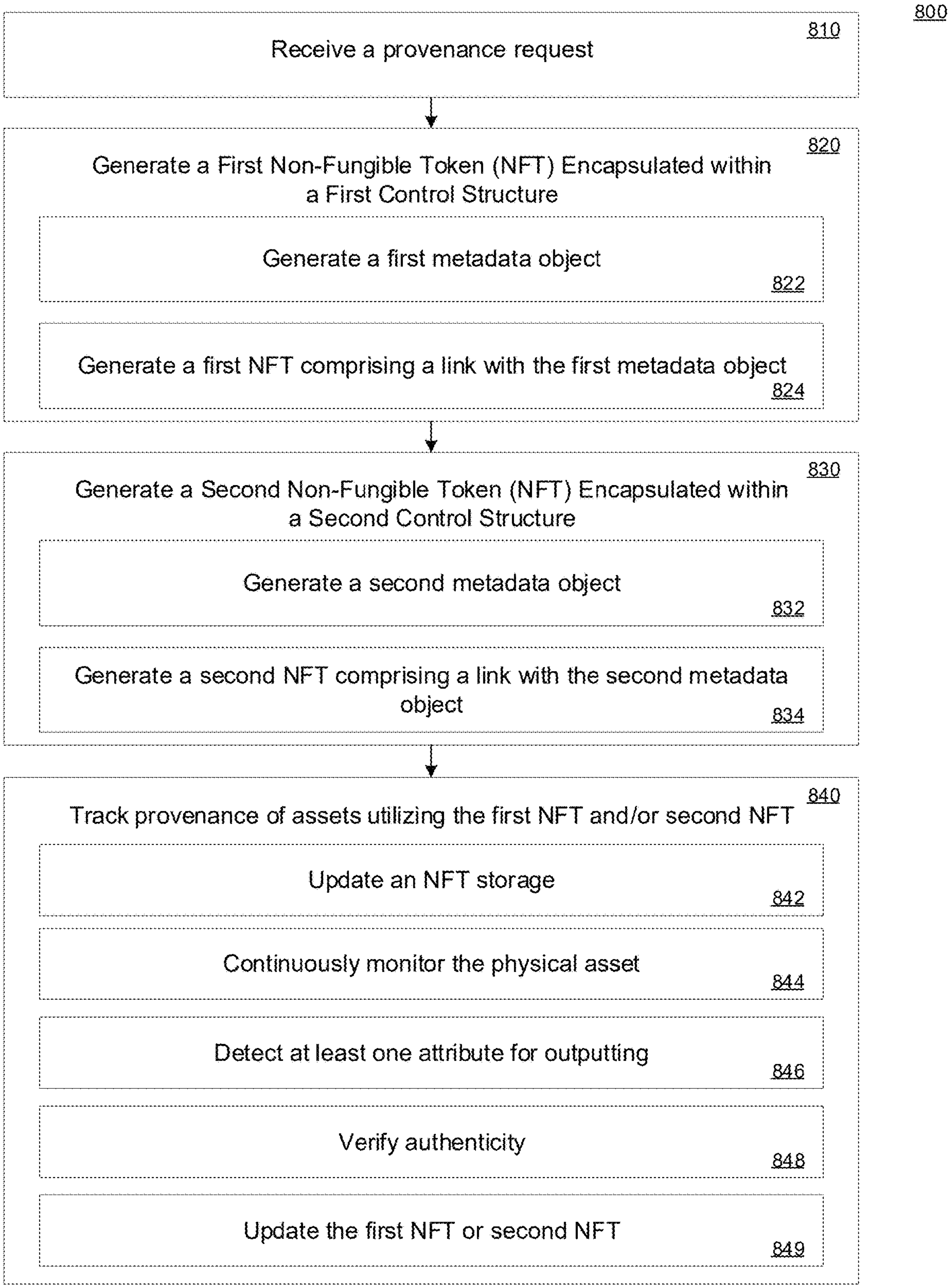
FIG. 8 illustrates a method to track provenance of assets utilizing non-fungible tokens (NFTs), in accordance with present implementations.

Referring now to FIG. 8, a flowchart for a method 800 to track provenance of assets utilizing non-fungible tokens (NFTs) in accordance with present implementations. At least one of the example systems 100, 200 and 600, or the example structures 300, 400, 500 and 700, can perform method 800 according to present implementations.

In broad overview of method 800, at block 810, the one or more processing circuits (e.g., data processing system 102) can receive a provenance request. At block 820, the one or more processing circuits can generate a first NFT encapsulated within a first smart contract control structure. At block 830, the one or more processing circuits can generate a second NFT encapsulated within a first smart contract control structure. At block 840, the one or more processing circuits can track provenance of assets utilizing the first NFT and/or second NFT. Additional, fewer, or different operations may be performed depending on the particular arrangement. In some embodiments, some, or all operations of method 800 may be performed by one or more processors executing on one or more computing devices, systems, or servers. In various embodiments, each operation may be re-ordered, added, removed, or repeated.

Referring to method 800 generally, method 800 provides improvements to authentication and data integrity by enabling tracking of product exchanges and the movement of the product through a supply chain. Thus, a first NFT (e.g., parent NFT) can be generated to represent a physical asset and a second NFT (and/or third NFT, fourth NFT, etc.) to represent a destination of a route of the physical asset or represent a digital asset (e.g., installed software or application) of the physical asset. For example, NFTs can be used to verify whether a particular software version used is up-to-standard to assure integrity. Furthermore, the physical asset can be tracked based on collecting off-chain data to determine when an attribute (e.g., geographic location, supply chain information) is satisfied, and when an attribute is satisfied, verify authenticity of the physical asset, and update the first NFT or the second NFT. Updating the first or second NFT can include enabling access to information of the first or second NFT that was previously restricted and/or outputting a fungible asset (e.g., a digital currency, a digital form of a fiat currency, or a digital financial instrument for exchange) or a non-fungible asset (e.g., NFT, real estate, domain names, event tickets, in-game items like avatars, etc.). In some implementations, the off-chain data can be received from a data channel between the one or more processing circuits and another third-party system (e.g., client system 103 or third-party device 105). Thus, the off-chain data can include, but is not limited to, movement information of the physical asset in a supply chain, location or geolocation data, temperature data, environment data (e.g., images, videos, biometrics, IoT data), and shipping data. Therefore, by using NFTs with particular control structures, aspects of this technical solution can eliminate the exposure of sensitive data within a supply chain and in a computer networked environments, which is a significant improvement over other asset and data protection architectures. This not only protects sensitive assets and other data from compromise, but also protects entities from exposure, which is a significant improvement to the security of computing systems.

At block 810, the one or more processing circuits can receive a provenance request. In particular, receiving can include receiving a provenance request for a physical asset associated with a proposed route. The provenance request can be received from a client system 103, third-party device 105, or another system or device connected to network 101. The provenance request can include information such as, but not limited to, a proposed route of the physical asset where the proposed route includes a plurality of attributes (e.g., destinations, geographic locations, origin or starting location), asset information (e.g., digital assets of the physical asset such as, software or applications stored on the physical asset, images and videos of the physical asset, identifier such as a scannable code (e.g., QR, bar code, universal product code (UPC), international article number (EAN), a randomized pixel configuration, data matric, etc.), a token such as, a data payload that is transmitted via a short-range wireless communication (e.g., via NFC, Bluetooth, and/or other short-range wireless communication signals)), client information (e.g., blockchain address, wallet address, public and private key pair, public key, private key, account information, location information, exchange history), and so on. Thus, the physical asset can be coupled to a tag (e.g., physical) such as a scannable code or token to provide identifying information of the physical asset.

Referring to attributes in more details, each attribute can include or consist of a key value pair, where the key is the rule that can be satisfied and the value is the output associated with the NFT and/or metadata object. For example, the attribute could be a destination attribute where the key could be a destination on the proposed route and the value could be a destination for transferring (e.g., wallet address, blockchain address) the NFT upon satisfying the rule. In another example, the attribute could be a timing attribute where the key could be a time the physical asset is delivered or arrives at a particular location on the proposed route and the value could be a digital currency value and a destination for transferring the digital currency upon satisfying the rule. In yet another example, the attribute could be a quality attribute where the key could be an image or video of the physical asset in original condition and the value could be an activation code for activating the digital asset (e.g., software application) on the physical asset upon satisfying the rule. The metadata control structures can analyze off-chain data and the attributes to determine if the value of the attribute is satisfied, and in turn output based on the key of the attribute.

As used herein, a "public and private key pair" (or "verification and signing key pair", or "key pairs") can be generated based on a cryptographic function (e.g., symmetric-key algorithms (such as DES, AES), asymmetric-key algorithms (Ed25519 signing, ECC), public-key algorithms (such as RSA), and so on) and be stored on a blockchain (e.g., 159) or storage (e.g., 152, 154). In some arrangements, each blockchain can maintain (e.g., store and allow access to keys) a key dataset such that each NFT may be associated with a public and private key pair stored in the key dataset. Each public and private key pair can be shared amongst NFTs or can be unique to each digital asset on the ledger. In particular, the public key and the private key of the public and private key pairs can be mathematically related based on a mathematical algorithm, such that a private key be used to encrypt data (e.g., such as physical asset) and the public key can be used to decrypt the data, or vice versa. In some arrangements, the digital asset may be configured based on a standardized language (e.g., key-value pairs, dictionaries, tables, mappings, pairings) for interpreting data (e.g., metadata objects).

In some arrangements, upon identifying or generating public and private keys of NFT, the one or more processing circuits can sign the one or more NFT using one or more identified private keys and transmit the one or more NFTs or outputs with a public key (sometimes referred to herein as a "central public key") to the provider system 110 (e.g., in particular exchange interface 112). In particular, signing using the private key can include hashing (e.g., SHA1, MD5, etc.) the NFT and verifying using the public key can include decrypting the NFT using the public key to verify the digital signature came from the particular private key. In some arrangements, the keys may be symmetric (e.g., use the same key to sign/verify) or asymmetric (e.g., use different keys to sign/verify). For example, an algorithm (e.g., such as a hash algorithm) can be applied to a private key to generate a public key. Accordingly, public keys can be a cryptographic code that allows users and system described herein to receive NFTs and verify them prior to amending and/or updating the NFT or the blockchain ledger.

Additionally, the images and videos of the physical asset can be analyzed and/or interpolated by the one or more processing circuits to create a model of the physical asset. The model can designate a plurality of metadata areas within the image or video of the physical asset. The model can be trained to identify matches between the physical asset and a captured image or video at a future time (e.g., when the physical asset arrives at an attribute of the proposed route). In particular, matches can be between metadata areas of the physical asset and the metadata areas of the captured image. Additionally details regarding verifying the authenticity of at least a portion of the physical asset are described in detail with reference to block 848.

At block 820, the one or more processing circuits can generate a first metadata object (822) and generate a first NFT including a first link with the first metadata object (824). In general, blocks 822 and 824 disclose a process for generating an NFT digitally representing a physical asset. The link, upon selection, can be configured to present an image or video of the physical asset and the link can be the destination or pointer to the storage location of the first metadata object.

At block 822, generating can include generating a first metadata object including metadata of the physical asset and a plurality of attributes for outputting based on the proposed route. In some arrangements, the one or more processing circuits can generate one or more metadata objects in accordance with a provenance request associated with a proposed route. The one or more processing circuits can receive, collect, or obtain metadata of the physical asset including, but not limited to, video, scannable code, audio, text, any media or digital representation, public and private key pair, executable programs, or any combination thereof of the physical asset. Additionally, the one or more processing circuits can receive, collect, or obtain attributes (or rules) for outputting based on the proposed route. The attributes include, but not limited to, geographic locations on the proposed route of the physical asset and a non-fungible or fungible value (e.g., designated output) to be outputted based on being present or reaching one or more geographical locations, geographic locations on the proposed route of the physical asset and the metadata (e.g., designated output) to be outputted based on being present or reaching one or more geographical locations, a destination attribute including rules (e.g., geographic location designations, timing requirements (e.g., was received within 3 days of shipping, was received within 5 days of shipping, was delayed at least once, delivered before a designate time of day, etc.), quality and quantity requirement (e.g., dimension of the physical asset, quantity of the physical asset, quantity of the parts of the physical asset), etc. for determining when the destination is achieved or reached and a designated output upon reaching the destination.

In some arrangements, the at least one processing circuit can be further configured to generate a control structure based on the attributes, wherein the control structure is stored as at least one of a smart contract, or in a block on an internal ledger. In some arrangements, one or more control structures can be generated based on the attributes that are executable to restrict output of one or more particular metadata objects. In particular, the one or more processing circuits can obtain attributes for outputting and can generate a control structure corresponding to the attributes. For example, the one or more processing circuits can generate a control structure to encapsulate a plurality of metadata objects each associated with a particular attribute of the physical asset. The control structure can restrict access to the metadata object within the control structure, by an encapsulation layer that, for example, encrypts all metadata objects within the control structure with a common encryption scheme. The encapsulation layer can control output of multiple metadata objects within the control structure by uniformly and concurrently decrypting the metadata objects according to the common encryption scheme.

As used herein, a “smart contract control structure,” “metadata control structure,” and “control structure” may be a computer program (also known as a program, software, software application, script, or code) configured to combine one or more attributes of the physical or digital asset together to create a single control structure for each metadata object. In some arrangements, the one or more processing circuits can implement and execute a control structure to output, append, or update metadata objects of one or more NFTs to include one or more metadata, attributes, and conditions (e.g., smart contracts), fields, a value, and so on. The control structure can be written in any form of programming language, including compiled or interpreted languages, and/or declarative or procedural languages, and it can be deployed in any form, including as a stand-alone program or as a circuit, component, subroutine, object, or other unit suitable for use in a computing environment. A metadata object may, but need not, correspond to a file in a file system. A metadata object can be stored in a portion of a file that holds other programs or data (e.g., one or more scripts stored in a markup language document), in a single file dedicated to an NFT in question, or in multiple coordinated files (e.g., files that store one or more subsystems, sub-programs, or portions of code). A control structure can be deployed to be executed on one computer or on multiple computers that are located at one site or distributed across multiple sites and interconnected by a communication network. The processes and logic flows described in this specification can be performed by one or more programmable processors executing one or more control structures (or computer programs) to perform actions by operating on input data (e.g., off-chain data, provenance requests, etc.).

As used herein, the phrase “smart contract” generally refers to a self-executing code (e.g., in a ledger network or other system) that executes when a set of conditions that have been agreed upon by the parties of the smart contract are met. Although the FIGS. and specification generally discuss utilizing smart contracts on NFTs, the systems, methods, and apparatuses disclosed herein can also be used for a plurality of types of non-fungible or fungible assets, such as but not limited to commodities, common shares, options, dollar bills, fiat currency, digital currency, deeds, leases, wills, other exchanges, non-smart contracts, traditional legal contracts, financial disbursements, taxes, and other types of non-fungible or fungible assets parties use and exchange. Parties to the smart contract for NFTs or other types of non-fungible or fungible assets may be individuals, companies, organizations, entities, providers, and so on.

At block 824, generating can include generating, based on the first metadata object, a first NFT including a first link with the first metadata object, wherein the first NFT is encapsulated within a first control structure that restricts a first output of the first metadata object to a first remote device remote from the one or more processors, and wherein the first NFT digitally represents the physical asset. In general, the one or more processing circuits can generate (or mint) one or more non-fungible tokens linked to particular metadata objects and encapsulated within a first control structure. The one or more processing circuits can generate a token corresponding to a particular metadata object or metadata objects. Generating and/or minting an NFT can include converting a physical asset or digital file/asset into a digital asset stored on a blockchain. Thus, the NFT can digitally represent the physical asset or a digital asset and can serve as proof of ownership and provenance of a specific asset. The NFT can be verified by anyone on a blockchain and the token ensures authenticity of the physical asset or digital asset. Each NFT can store a data value composed of at least a token identifier and a contract number. The token identifier can be a unique set of characters (e.g., numbers, symbols, and letters) uniquely identifying the specific NFT. For example, token identifier #1 can be identified as “G8fNM64!”, and token identifier #2 can be identified as “lkj93IOs.” The contract number can be a unique set of characters (e.g., numbers, symbols, and letters) uniquely identifying the control structure used by the NFT in managing and executing the functionality such as restricting the NFT, outputting from the NFT, etc. For example, control structure #1 can be identified as “CS_00001”, and control structure #2 can be identified as “CS_00002.” Thus, the data value can be an aggregate of the two identifier, such as a cryptographic hash of the two identifiers (e.g., data value before hash “G8fNM64!CS_00001”, after hash “DFCD 3454 BBEA 778B 712A 652G 336F 90B1 7D9A 46AF”), or encrypted (e.g., using RSA encryption, AES encryption, SHA encryption, DES encryption). In some arrangements, the data value can be the public key of the NFT used to decrypt the NFT and/or interface with the destination address on the blockchain.

In some arrangements, the one or more processing circuits can hash (e.g., SHA1, MD5, etc.), using a cryptographic hash or another math-based function, the control structure (or contract number) to create a digital signature of the control structure which can be stored in control structure storage 158. The cryptographic hash of the control structure can be incorporated into child NFTs to restrict functionality of the child NFT and increase security of the child NFT as an exchange with a child NFT (e.g., output of fungible value or non-fungible value via a token or currency transfer) includes knowledge or access to the parent NFT (e.g., first NFT of block 820) prior to amending and/or updating the child NFT or blockchain.

In some arrangements, the one or more processing circuits can hash (e.g., SHA1, MD5, etc.), using a cryptographic hash or another math-based function, the first NFT to create a digital signature of the first NFT which can be stored in blockchain storage 159. The cryptographic hash of the first NFT can allow users and system described herein to receive NFTs and verify them prior to amending and/or updating the NFT or blockchain.

In some arrangements, the one or more processing circuits can obtain a preexisting token and can assign the preexisting token to a particular metadata object or metadata objects. In other arrangements, the one or more processing circuits can generate a non-fungible token that is unique against all other tokens generated by the one or more processing circuits can to identify metadata objects, a fungible token that can be generated or replicated an arbitrary number of times, and a semi-fungible token that can be generated or replicated a particular number of times below or meeting a particular replication threshold. One or more fungible tokens or semi-fungible tokens can, for example, be associated with a particular metadata object or the same metadata object. The one or more processing circuits can access the fungible token storage 154 to determine whether the replication threshold corresponding to a particular threshold is satisfied, and can block or forgo generation or replication of a token beyond or meeting the replication threshold in response to a determination that the replication threshold corresponding to a particular threshold is satisfied. For example, the NFT generator 530 can generate multiple NFTs based on a number of new metadata objects or NFTs indicated by an obtained preexisting token.

The output of the first NFT that can be restricted to a first remote device (e.g., client system 103 or third-party device 105) remote from the one or more processing circuits. The restriction can be an attribute and once at least one or more attributes of the control structures are satisfied and/or detected an output can occur. Additionally, outputting can also be restricted prior to verifying the authenticity of at least a portion of the physical or digital asset. In some arrangements, outputting can include releasing or transmitting a fungible value or asset from one digital wallet address (e.g., blockchain address) to a second digital wallet address. In various arrangements, outputting can include releasing or transmitting a non-fungible value or asset from one digital wallet address (e.g., blockchain address) to a second digital wallet address.

At block 830, the one or more processing circuits can generate a second metadata object (832) and generate a second NFT (sometimes referred to herein as a "child NFT") including a second link with the second metadata object (834). In general, blocks 323 and 324 disclose a process for generating an NFT digitally representing a digital asset (or another physical asset which is a component of the physical asset in block 820). The NFT can be a child NFT of the parent NFT, such that a parent NFT can include a plurality of child NFT associated with or representing digital asset or physical components of the physical asset described above. The link, upon selection, can be configured to present an image or video the digital asset and link can be the destination or pointer to the storage location of the second metadata object. For example, the digital asset can be a software application installed on the physical asset, and where the software application includes at least one of a software version or source code.

At block 832, generating can include generating a second metadata object including an aggregation of a first digital asset of the physical asset and at least one of the first NFT or a first cryptographic hash of the first metadata object. The first digital asset can include, but is not limited to, source code, version, or software identifier of a software application installed or stored on the physical asset. Additionally, the digital asset can include any digitally stored data on the physical asset that can be verified at various locations or destinations on the proposed route. The second metadata object can be a cryptographic hash of the first metadata object or identifier of the first metadata object and queried from the control structure storage. Aggregation can include cryptographically hashing or encrypting the first digital asset of the physical asset and at least one of the first NFT or a first cryptographic hash of the first metadata object. For example, the software version (e.g., V3.4) and the cryptographic hash of first metadata object (e.g., 4581 JKLE 2GBY 65LO) can be aggregated based on cryptographically hashing the two to create an aggregate value (e.g., 526G 85YU MRZL 251Y) that can be stored as a second metadata object. In some arrangements, aggregation can include concatenating the at least two values (e.g., first digital asset and first NFT, first digital asset and first cryptographic hash, first digital asset and first NFT and first cryptographic hash) together. For example, the software version (e.g., V3.4) and the cryptographic hash of first metadata object (e.g., 4581 JKLE 2GBY 65LO) can be concatenated based on cryptographically hashing the two to create an aggregate value (e.g., V3.4 4581 JKLE 2GBY 65LO, or 4581 JKLE 2GBY 65LO V3.4) that can be stored as a second metadata object. In other arrangements, aggregation can include any type of merging or combining of the at least two values.

Additionally, the second metadata object can be generated based on the attributes, wherein the control structure is stored as at least one of a smart contract, or in a block on an internal ledger. In some arrangements, one or more control structures can be generated based on the attributes that are executable to restrict output of one or more particular metadata objects. In particular, the one or more processing circuits can obtain attributes for outputting and can generate a control structure corresponding to the attributes. For example, the one or more processing circuits can generate a control structure to encapsulate a plurality of metadata objects each associated with a particular attribute of the digital asset. The control structure can restrict access to the metadata object within the control structure, by an encapsulation layer that, for example, encrypts all metadata objects within the control structure with a common encryption scheme. The encapsulation layer can control output of multiple metadata objects within the control structure by uniformly and concurrently decrypting the metadata objects according to the common encryption scheme. In one example, the metadata object can be associated with (e.g., stored external from the metadata object) or store a public and private key pair associated with a fungible value (e.g., a form of digital currency, fiat currency, or digital financial instrument for exchange). The control structure can be generated to enable execution of an output of the fungible value to a digital wallet in response to detecting the at least one attribute for outputting is satisfied based on the off-chain data (e.g., arrived at a location based on off-ledger data).

At block 834, generating can include generating, based on the second metadata object, a second NFT including a second link with the second metadata object, wherein the second NFT is encapsulated within a second control structure that restricts a second output of the second metadata object to a second remote device remote from the one or more processors, and wherein the second NFT digitally represents the first digital asset. Block 324 includes similar features and functionality as described in detail with reference to block 824. Additionally, the output of the second NFT that can be restricted to a second remote device (e.g., client system 103 or third-party device 105) remote from the one or more processing circuits. In particular, block 824 discloses an output that could be an output of a fungible value to a seller upon arrival at a final destination, whereas block 834 discloses an output that could be an output of a fungible value to a supplier upon arrival at a destination along the proposed route. The restriction can be an attribute and once at least one or more attributes of the control structures are satisfied and/or detected an output can occur. Additionally, outputting can also be restricted prior to verifying the authenticity of at least a portion of the physical or digital asset. In some arrangements, outputting can include releasing or transmitting a fungible value or asset from one digital wallet address (e.g., blockchain address) to a second digital wallet address. In various arrangements, outputting can include releasing or transmitting a non-fungible value or asset from one digital wallet address (e.g., blockchain address) to a second digital wallet address.

For example, the one or more processing circuits can generate one or more child NFTs each including a link or a reference to the parent (or primary) NFT to identify a source NFT corresponding to the NFT minted by the one or more processing circuits. For example, the one or more processing circuits can generate one or more NFTs each including a link or a reference to an NFT from which the new NFTs are minted. Thus, the one or more processing circuits can provide a technical improvement of validating a minting of an NFT based on a provenance parameter embedded in the child NFT. The provenance parameter can include a hash of the primary NFT or the NFT from which the new NFTs are minted, for example. Generating an NFT and minting an NFT can be used interchangeably. In some arrangements, each child NFT can be generated for each stop or a plurality of locations along the proposed route. In various arrangements, each child NFT can be generated for each software application installed and/or stored on the physical asset. In some arrangements, the child NFTs can include a combination of stops or locations along the proposed route and software application installed and/or stored on the physical asset.

Additionally at block 830, the one or more processing circuits can receive a second digital asset of the physical asset. The one or more processing circuits can also generate a third metadata object including an aggregation of the second digital asset (e.g., cryptographic hash of the second metadata object, hash of the second NFT) and the first cryptographic hash of the first metadata object. In some arrangements, the one or more processing circuits can encrypt or hash the third metadata object to create a third cryptographic hash, where the third metadata object includes the first cryptographic hash.

At block 840, the one or more processing circuits can update an NFT storage (842), continuously monitor the physical asset (844), detect at least one attribute for outputting (846), verify authenticity (848), and update the first NFT or second NFT (849). In general, blocks 842, 844, 846, 848, and 849 disclose a process for tracking the provenance of assets (e.g., physical and digital) utilizing the first NFT and/or second NFT.

In particular, at block 842, updating can include updating an NFT storage to include the first NFT and the second NFT. In some arrangements, updating can include broadcasting the first NFT and the second NFT to the blockchain. In various arrangements, each NFT can be stored at a corresponding addresses for each NFT that indicates (or includes) links with the corresponding NFT (e.g., child to parent links). In executing the updating, the one or more processing circuits can generate public and private key pairs for each of the NFTs stored. In some arrangements, the one or more processing circuits can encrypt the first metadata object to create the first cryptographic hash and update the first NFT in the NFT storage to include the first cryptographic hash. In various arrangements, the one or more processing circuits can also encrypt the second metadata object to create a second cryptographic hash, where the second metadata object comprises the first cryptographic hash, and update the second NFT in the NFT storage to comprise the second cryptographic hash.

At block 844, monitoring can include continuously monitoring the physical asset based on collecting off-chain data from one or more off-chain data feeds. In some arrangements, the one or more processing circuits can establish, utilizing an application programming interface (API), a data feed associated with the attributes and can monitor the data feed including executing API calls with the API, where the API calls return off-chain data (e.g., geographic locations, approximate geographic locations, user interactions with the physical or digital asset in the environment, humidity or temperature of the environment or the physical or digital asset, or other characteristics/environmental data of the environment or the physical or digital asset). In some arrangements, the off-chain data can be selectively received based on the attributes of one or more control structures of the NFTs. For example, the one or more processing circuits may query a physical tag (e.g., sensor or GPS tracker) on the physical asset (e.g., 103, 105) for geolocation location information based on attribute X of control structure A. In another example, the one or more processing circuits may query a news feed (e.g., 103, 105) for environment information (e.g., including temperature, humidity, and altitude) based on attribute Y of control structure B. In yet another example, the one or more processing circuits may query John Doe's mobile device (e.g., 103, 105) for recent geographic locations of the mobile device based on attribute Z of control structure C. Additionally, off-chain data can include digital asset information (e.g., source code, version, other features, or content) or physical asset information (e.g., images, videos, audio, or other content) received from a client system (e.g., 103, 105) or any other computing device.

In general, off-chain data can be data collected and generated by one or more devices and/or systems (e.g., client system 103, third-party device 105, or other data sources) in system 100 (e.g., computing environment). That is, off-chain data can be data detected from sources external to the data processing system 102 (e.g., data not stored in 152, 154, 156, 158, 159). The off-chain data can include, but is not limited to, network or virtual off-chain data, physical or natural off-chain data, or social off-chain data. The one or more devices and/or systems described herein can use one or more input devices to collect and aggregate the off-chain data. For example, network or virtual off-chain data can include, but is not limited to, IP addresses, MAC addresses, network scanning data, physical asset or digital asset network information, governmental data (e.g., FBI databases, CIA databases, COVID-19 databases, No Fly List databases, terrorist databases, vulnerability databases, and certificate databases), network packets, host name, network addresses, communication protocols, interactions with other networks or devices (e.g., physical asset scanned by device on a particular network), historical exchange data (e.g., previous exchanges of the NFT, digital currency, or physical asset), historical route data (e.g., supply chain data), documents, agreements, smart contracts, ledger information, and so on. In another example, physical or natural off-chain data can include, but is not limited to, biometric data (of users or individuals interacting with the physical or digital asset, e.g., biological data such as, fingerprint, iris/retina, hand geometry, facial geometry, DNA, and so on, and behavioral data such as, gait, gesture, keystroke dynamics, speech pattern, foot movement pattern, etc.), weather conditions (e.g., of the proposed route, at particular locations based on previous geographic information of the physical asset), geographic locations (e.g., latitude and longitude, triangulation, approximate location), and so on. In yet another example, social off-chain data can include, but is not limited to, social media data (content depicting or capturing the physical or digital asset, or text in timelines or other textual content discussing the physical or digital asset, such as on, Facebook™, Twitter™, Snapchat™, and TikTok™), news feed data (e.g., articles, breaking news, and television content including information or data about the physical or digital asset), and so on.

In some arrangements, the one or more processing circuits can establish, utilizing an application programming interface (API), a data feed between the one or more processing circuits and the one or more devices and/or systems. The one or more processing circuits can monitor the data feeds including executing API calls with the API, where the API calls return the off-chain data, and in turn analyze the off-chain data to detect an attribute has been satisfied (block 846). In various arrangements, the one or more processing circuits can receive, collect, and/or scan off-chain from a plurality of data channels. Each data channel of the plurality of data channels may be communicatively connected to the one or more processing circuits via a data channel communication network such that each device connected to the data channel can be a computing device that can store, generate, and collect data. Further, the one or more processing circuits can also collect off-chain data by querying a plurality of data sources.

At block 846, detecting can include detecting, by at least one of the first control structure or the second control structure, at least one attribute for outputting of the plurality of attributes for outputting is satisfied based on the off-chain data. The attributes (sometimes referred to herein as parameters) can govern the modification, generation, and output of the metadata objects, fungible/non-fungible values, or fungible/non-fungible assets associated with the NFT. As shown, each NFT includes attributes, where each attribute can include rules (described above as a key of the key value pair) for restricting the output, and satisfying the rules for output (described above as a value of the key value pair) can be determined by the metadata control structures. In some arrangements, the one or more processing circuits can detect at least one attribute for outputting is satisfied based on the first control structure and/or second control structure executing instructions and determining the off-chain data received satisfies at least one attribute (e.g., in particular a value of the key value pair of the attribute).

At block 848, verifying can include, in response to detecting the at least one attribute for outputting is satisfied, verifying authenticity of at least a portion of the physical asset. Verifying authenticity can include cross-referencing the detected off-chain data with data stored by the one or more processing circuits such as, but not limited to metadata of the physical asset or metadata of the digital asset. For example, the barcode (e.g., off-chain data) of the physical asset could be scanned at a location along the proposed route, and the scanned barcode can be cross-referenced against the original barcode of the physical asset to determine a match. In the following example, if the scanned barcode matches the original barcode the physical asset can be verified. In another example, the source code or version of the digital asset on the physical could be received, and the received source code or version can be cross-referenced against the original source code or version of the digital asset of the physical asset to determine a match. In the following example, if the received source code or version matches the original source code or version the physical asset can be verified. In yet another example, the quantity of components of the physical asset could be received, and the received quantity can be cross-referenced against the original quantity of components of the physical asset to determine a match. In the following example, if the received quantity matches the original quantity the physical asset can be verified.

In some arrangements, when the off-chain data includes image(s) or video(s), verifying authenticity of at least a portion of the physical asset can include modeling the off-chain data. In particular, the model can generate a content area percentage match for each content area of the physical asset. For example, the physical asset may include 9 content areas, and upon receiving the captured image, the one or more processing circuits can designate 9 content areas of the captured image (e.g., entire or portion of the captured image) and input each content area into the model and determine a content area percentage match with the corresponding content area of the physical asset. In another example, the one or more processing circuits can receive a first digital representation (e.g., off-chain data) of the physical asset, wherein the first digital representation is at least one of an image, a scannable code, a video, or data received from a communication interaction. In the following example, the one or more processing circuits can analyze or model the first digital representation based on collecting one or more content areas of the first digital representation and cross-referencing the one or more content areas with a second digital representation stored in the metadata of the physical asset. Thus, captured images and video can be received and inputted into the trained model (e.g., artificial intelligence (AI), machine learning, neural network, linear regression, estimator, image recognition model (IRM)). The model can output a prediction if the captured images or video match the physical asset (e.g., match, no-match, partial match) or a prediction indicating a percentage of match (e.g., 75% likely it is a match, 89% likely it is a match), and so on). Additionally, the model can also measure the quality of the physical asset such that a match and quality of the physical asset can be assessed. For example, the model can also, in response to an input of an image or video, can analyze the content areas to determine if the quality of the captured content areas of the physical asset is of sufficient quality (e.g., no environmental conditions such as water damage or rust, no excessive temperature exposure (e.g., burst capacitors indicating the physical asset was exposed to excessive heat for a period of time), no dents or noticeable marks on the physical asset, etc.).

At block 849, updating can include updating the first NFT or the second NFT based on an output. Updating at least one of the NFTs can include, but is not limited to, modifying the metadata object (e.g., update ownership, update location, update attributes), execute exchange of the NFT (e.g., on the blockchain between two address, or off-blockchain from an address on chain to an address off-chain). In particular, updating an NFT can include accessing the NFT storage (e.g., a blockchain ledger) to modify the metadata object or executing an exchange. Updating can include outputting to a remote device (e.g., client device 103, third-party device 105). For example, the first control structure and second control structure can restrict one or more functionalities or uses of the physical or digital asset and outputting can enable the functionality or use (e.g., register the physical asset, enable or activate the warranty with the physical asset, unlock the digital asset (e.g., software application) for use, provide and/or install a product key for activation of the digital asset, transfer of ownership of the physical or digital asset by transferring the first NFT or second NFT) upon satisfaction of the attribute. In another example, the first control structure and second control structure can restrict an output such as a fungible value (e.g., fiat currency, crypto-currency, physical cash, digital cash, central bank digital currency (CBDC)) or non-fungible value (e.g., mortgage of property, deed of property, stock, meme, logo, photo, music album, collage, tweet, newspaper article, video) and outputting can enable the transfer or exchange of the fungible value or non-fungible value upon satisfaction of the attribute. In some arrangements, the physical asset or digital asset functionalities or the values can be compartmentalized such that various functionalities or values can be unlocked or transferred when at least one attribute is satisfied. In the following example, the exchange or transfer can be between a first address on a blockchain (e.g., blockchain storage 159) or first digital wallet address to a second address on the blockchain or a second digital wallet address. In another example, the output can be a fungible asset or non-fungible asset from a first digital wallet address to a second digital wallet address.

In particular, the attribute may be a destination (key) and the output can be $10,000 of digital currency (value) such that upon satisfying the key the value can be outputted by executing instructions of the metadata control structure. For example, the second metadata object can store a public and private key pair associated with a fungible value, and wherein the second control structure is configured to output the fungible value to a digital wallet in response to detecting the at least one attribute for outputting is satisfied and/or verifying authenticity. The transferring and exchanging of fungible and non-fungible values (generally referred to as digital assets) performed or executed by the one or more processing circuits, according to various illustrative arrangements, is described in U.S. patent application Ser. No. 17/528,352, filed Nov. 17, 2021, the entirety of which is incorporated by reference herein.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the disclosure be defined by the claims appended hereto and their equivalents.

What is claimed is:

1. A system to track provenance of assets utilizing non-fungible tokens (NFTs), the system comprising:

a data processing system comprising memory and one or more processors to:

receive a provenance request for a physical asset associated with a proposed route;

generate a first metadata object comprising metadata of the physical asset and a plurality of key-value pairs for outputting based on the proposed route, a key of each key-value pair corresponding to a rule to be satisfied and a value of each key-value pair comprising an output corresponding to the first metadata object;

generate a first NFT encapsulated within a first control structure that restricts a first output of the first metadata object, the first output corresponding to at least one output of at least one key-value pair of the plurality of key-value pairs;

generate a second metadata object based on the physical asset and at least one of the first NFT or a first cryptographic object of the first metadata object, wherein the second metadata object stores a public and private key pair associated with a fungible value;

generate a second NFT encapsulated within a second control structure that restricts a second output of the second metadata object;

continuously monitor the physical asset based on collecting off-chain data from one or more off-chain data feeds;

detect at least one rule of a key-value pair of the plurality of key-value pairs for outputting is satisfied based on the off-chain data;

in response to detecting the at least one rule, output the fungible value to a digital wallet in response to detecting the at least one rule is satisfied, the fungible value corresponding to at least one value of the key-value pair; and in response to detecting the at least one rule for outputting is satisfied, verify authenticity of at least a portion of the physical asset.

2. The system of claim 1, wherein each of the plurality of key-value pairs comprises a geographic location on the proposed route of the physical asset.

3. The system of claim 1, the data processing system further to:

update at least one of the first NFT or the second NFT in an NFT storage to comprise at least one of the first cryptographic object or a second cryptographic object.

4. The system of claim 3, wherein the NFT storage is a blockchain ledger, and wherein the fungible value is in a form of a digital currency, a digital form of a fiat currency, or a digital financial instrument for exchange.

5. The system of claim 1, wherein to cryptographically generate the first cryptographic object, the data processing system further to encrypt the first metadata object to create a first cryptographic hash, and wherein to cryptographically generate a second cryptographic object, the data processing system further to encrypt the second metadata object to create a second cryptographic hash, wherein the second metadata object comprises the first cryptographic hash.

6. The system of claim 5, wherein a first digital asset of the physical asset comprises a software application installed on the physical asset, and wherein the software application comprises at least one of a software version or source code.

7. The system of claim 6, wherein to verify the authenticity of at least the portion of the physical asset, the data processing system further to:

receive a second digital asset of the physical asset;

generate a third metadata object comprising an aggregation of the second digital asset and the first cryptographic hash of the first metadata object;

encrypt the third metadata object to create a third cryptographic hash, wherein the third metadata object comprises the first cryptographic hash; and verify the authenticity of the first digital asset based on cross-referencing the third cryptographic hash with the second cryptographic hash stored in an NFT storage.

8. The system of claim 1, wherein to verify the authenticity of at least the portion of the physical asset, the data processing system further to:

receive a first digital representation of the physical asset, wherein the first digital representation is at least one of an image, a scannable code, a video, or data received from a communication interaction; and analyze the first digital representation based on collecting one or more content areas of the first digital representation and cross-referencing the one or more content areas with a second digital representation stored in the metadata of the physical asset.

9. The system of claim 1, wherein the first NFT is a data value composed of at least a first token identifier and a first contract number, wherein the first contract number identifies the first control structure that manages the first NFT.

10. The system of claim 1, the data processing system further to:

output, from a first digital wallet address, a fungible asset or a non-fungible asset to a second digital wallet address in response to detecting the at least one rule for outputting is satisfied and verifying the authenticity of at least the portion of the physical asset.

11. A method to track provenance of assets utilizing non-fungible tokens (NFTs), the method comprising:

receiving, by one or more processing circuits, a provenance request for a physical asset associated with a proposed route;

generating, by the one or more processing circuits, a first metadata object comprising metadata of the physical asset and a plurality of key-value pairs for outputting based on the proposed route, a key of each key-value pair corresponding to a rule to be satisfied and a value of each key-value pair comprising an output corresponding to the first metadata object;

generating, by the one or more processing circuits, a first NFT encapsulated within a first control structure that restricts a first output of the first metadata object, the first output corresponding to at least one output of at least one key-value pair of the plurality of key-value pairs;

generating, by the one or more processing circuits, a second metadata object based on the physical asset and at least one of the first NFT or a first cryptographic object of the first metadata object, wherein the second metadata object stores a public and private key pair associated with a fungible value;

generating, by the one or more processing circuits, a second NFT encapsulated within a second control structure that restricts a second output of the second metadata object;

continuously monitoring, by the one or more processing circuits, the physical asset based on collecting off-chain data from one or more off-chain data feeds;

detecting, by the one or more processing circuits, at least one rule of a key-value pair of the plurality of key-value pairs for outputting is satisfied based on the off-chain data;

in response to detecting the at least one rule, outputting, by the one or more processing circuits, the fungible value to a digital wallet in response to detecting the at least one rule is satisfied, the fungible value corresponding to at least one value of the key-value pair; and in response to detecting the at least one rule for outputting is satisfied, verifying, by the one or more processing circuits, authenticity of at least a portion of the physical asset.

12. The method of claim 11, wherein each of the plurality of key-value pairs comprises a geographic location on the proposed route of the physical asset.

13. The method of claim 11, further comprising:

updating, by the one or more processing circuits, at least one of the first NFT or the second NFT in an NFT storage to comprise at least one of the first cryptographic object or a second cryptographic object.

14. The method of claim 13, wherein the NFT storage is a blockchain ledger, and wherein the fungible value is in a form of a digital currency, a digital form of a fiat currency, or a digital financial instrument for exchange.

15. The method of claim 11, wherein cryptographically generating the first cryptographic object comprises encrypting, by the one or more processing circuits, the first metadata object to create a first cryptographic hash, and wherein cryptographically generating a second cryptographic object comprises encrypting, by the one or more processing circuits, the second metadata object to create a second cryptographic hash, wherein the second metadata object comprises the first cryptographic hash.

16. The method of claim 15, wherein a first digital asset of the physical asset is a software application installed on the physical asset, and wherein the software application comprises at least one of a software version or source code.

17. The method of claim 16, wherein verifying the authenticity of at least the portion of the physical asset comprises:

receiving, by the one or more processing circuits, a second digital asset of the physical asset;

generating, by the one or more processing circuits, a third metadata object comprising an aggregation of the second digital asset and the first cryptographic hash of the first metadata object;

encrypting, by the one or more processing circuits, the third metadata object to create a third cryptographic hash, wherein the third metadata object comprises the first cryptographic hash; and verifying, by the one or more processing circuits, the authenticity of the first digital asset based on cross-referencing the third cryptographic hash with the second cryptographic hash stored in an NFT storage.

18. The method of claim 11, wherein verifying the authenticity of at least the portion of the physical asset comprises:

receiving, by the one or more processing circuits, a first digital representation of the physical asset, wherein the first digital representation is at least one of an image, a scannable code, a video, or data received from a communication interaction; and analyzing, by the one or more processing circuits, the first digital representation based on collecting one or more content areas of the first digital representation and cross-referencing the one or more content areas with a second digital representation stored in the metadata of the physical asset.

19. The method of claim 11, wherein the first NFT is a data value composed of at least a first token identifier and a first contract number, wherein the first contract number identifies the first control structure that manages the first NFT.

20. A non-transitory computer readable medium including one or more instructions stored thereon and executable by one or more processors to:

receive a provenance request for a physical asset associated with a proposed route;

generate a first metadata object comprising metadata of the physical asset and a plurality of key-value pairs for outputting based on the proposed route, a key of each key-value pair corresponding to a rule to be satisfied and a value of each key-value pair comprising an output corresponding to the first metadata object;

generate a first NFT encapsulated within a first control structure that restricts a first output of the first metadata object, the first output corresponding to at least one output of at least one key-value pair of the plurality of key-value pairs;

generate a second metadata object based on the physical asset and at least one of the first NFT or a first cryptographic object of the first metadata object, wherein the second metadata object stores a public and private key pair associated with a fungible value;

generate a second NFT encapsulated within a second control structure that restricts a second output of the second metadata object;

continuously monitor the physical asset based on collecting off-chain data from one or more off-chain data feeds;

detect at least one rule of a key-value pair of the plurality of key-value pairs for outputting is satisfied based on the off-chain data;

in response to detecting the at least one rule, output the fungible value to a digital wallet in response to detecting the at least one rule is satisfied, the fungible value corresponding to at least one value of the key-value pair; and in response to detecting the at least one rule for outputting is satisfied, verify authenticity of at least a portion of the physical asset.

* * * * *